United States Patent
Moon et al.

(10) Patent No.: US 10,915,633 B2
(45) Date of Patent: Feb. 9, 2021

(54) METHOD AND APPARATUS FOR DEVICE SECURITY VERIFICATION UTILIZING A VIRTUAL TRUSTED COMPUTING BASE

(71) Applicant: ELECTRONICS AND TELECOMMUNICATIONS RESEARCH INSTITUTE, Daejeon (KR)

(72) Inventors: Yong Hyuk Moon, Daejeon (KR); Dae Won Kim, Daejeon (KR); Young Sae Kim, Daejeon (KR); Seung Yong Yoon, Daejeon (KR); Jin Hee Han, Daejeon (KR); Jeong Nyeo Kim, Daejeon (KR); Jae Deok Lim, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 67 days.

(21) Appl. No.: 16/204,802

(22) Filed: Nov. 29, 2018

(65) Prior Publication Data
US 2019/0163910 A1     May 30, 2019

(30) Foreign Application Priority Data

Nov. 29, 2017   (KR) .................. 10-2017-0162221

(51) Int. Cl.
*G06F 21/57* (2013.01)
*G06F 21/51* (2013.01)
(Continued)

(52) U.S. Cl.
CPC .............. *G06F 21/572* (2013.01); *G06F 8/65* (2013.01); *G06F 8/654* (2018.02);
(Continued)

(58) Field of Classification Search
CPC combination set(s) only.
See application file for complete search history.

(56) References Cited

U.S. PATENT DOCUMENTS 9,223,982 B2   12/2015   Adams et al.
9,372,699 B2    6/2016   Bobzin
(Continued)

FOREIGN PATENT DOCUMENTS

KR           101702289 B1        2/2017

OTHER PUBLICATIONS

Yong-Hyuk Moon et al., "Towards Protected Firmware Verification in Low-Power Devices", SECURWARE 2017: The Eleventh International Conference on Emerging Security Information, Systems and Technologies, Sep. 12, 2017, pp. 177-179 and presentation slides.

*Primary Examiner* — Raymond N Phan
(74) *Attorney, Agent, or Firm* — Rabin & Berdo, P.C.

(57) ABSTRACT

A method and an apparatus for device security verification utilizing a virtual trusted computing base are provided. The validity of a key for decryption is verified by a secure memory loader running on a processor of a device after booting of the device which is a computing device, and if the key is valid, encrypted firmware stored in a memory of the device is decrypted using the key to verify the confidentiality of the firmware. Then, the security memory loader verifies the authentication and integrity of the firmware by comparing a signature value generated for the decrypted firmware with an existing signature value.

19 Claims, 15 Drawing Sheets

(51) Int. Cl.
*H04L 9/32* (2006.01)
*G06F 21/62* (2013.01)
*G06F 21/54* (2013.01)
*H04L 9/08* (2006.01)
*G06F 12/14* (2006.01)
*G06F 8/65* (2018.01)
*G06F 8/654* (2018.01)
*H04L 9/06* (2006.01)

(52) U.S. Cl.
CPC .......... *G06F 12/1408* (2013.01); *G06F 21/51* (2013.01); *G06F 21/54* (2013.01); *G06F 21/575* (2013.01); *G06F 21/62* (2013.01); *H04L 9/0631* (2013.01); *H04L 9/088* (2013.01); *H04L 9/0894* (2013.01); *H04L 9/0897* (2013.01); *H04L 9/3234* (2013.01); *H04L 9/3247* (2013.01); *H04L 9/3252* (2013.01); *G06F 2212/402* (2013.01)

(56) References Cited

U.S. PATENT DOCUMENTS

| | | | |
|---|---|---|---|
| 9,489,512 B2 | 11/2016 | Thom et al. | |
| 2009/0327741 A1* | 12/2009 | Zimmer | H04W 12/1006 713/183 |
| 2012/0226895 A1* | 9/2012 | Anderson | G06F 21/575 713/2 |
| 2012/0272296 A1* | 10/2012 | Hodzic | G06F 21/52 726/4 |
| 2013/0219499 A1* | 8/2013 | Park | G06F 21/57 726/23 |
| 2014/0082690 A1 | 3/2014 | Ju et al. | |
| 2014/0150096 A1* | 5/2014 | Moon | G06F 21/645 726/22 |
| 2016/0274918 A1 | 9/2016 | Moon | |

* cited by examiner

METHOD AND APPARATUS FOR DEVICE SECURITY VERIFICATION UTILIZING A VIRTUAL TRUSTED COMPUTING BASE

CROSS-REFERENCE TO RELATED APPLICATION

This application claims priority to and the benefit of Korean Patent Application No. 10-2017-0162221 filed in the Korean Intellectual Property Office on Nov. 29, 2017, the entire contents of which are incorporated herein by reference.

BACKGROUND OF THE INVENTION

(a) Field of the Invention

The present invention relates to a method for device security verification, and more particularly, to a method and an apparatus for device security verification based on a virtual trusted computing base.

(b) Description of the Related Art

Isolation technology is needed to protect security-sensitive code and data. Most computing devices use separate hardware blocks or software blocks to perform specific computation and data processing while maintaining confidentiality. For example, a software task that stores an encryption key in confidential storage and performs encryption processing may be isolated from other tasks.

A Mobile Trusted Module (MTM), which has been one of the typical R & D trends in the past, mainly performs encryption processing and maintains confidential data storage in MTM hardware, and its effect is recognized.

However, it is hard to modify security policy for hardware operation and thus it is difficult to cope with various service requirements. In addition, in order to operate the MTM hardware, separate system middleware has to be operated. Since the processing is performed manually only by the requirement of the corresponding software, there is a structural vulnerability that it cannot directly detect or respond to problems such as system security flaws.

As another research and development flow, there is a technique of remote verification of reliability of a device using an external trust entity (e.g., a server). This technique is typically implemented in a structure in which an external verifier requests a response that can prove the reliability of the current state from a device verifier by using challenge-response techniques. However, the structure that guarantees the isolation operation of the device verifier itself is still being discussed as a problem to be solved.

There is a method for checking the integrity of firmware (or an operating system) and boot loader by comparing a checksum value based on code memory traverse with an original checksum value. However, it is difficult to deal with the manipulation of program control flow due to a code execution attack in a data memory (stack or heap) area and arbitrary change a function return address. For example, a return-oriented programming (RoP) attack can exploit malicious attacks by executing arbitrary code fragments without altering or damaging an original memory byte value.

Thus, in the prior art, there are problems such as passivity of the hardware-based trust computing base operation, difficulty of securing isolation of the internal software security component of the device, and limitations of a simple reliability checking method.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for effectively performing device security verification using a virtual trust computing base.

An exemplary embodiment of the present invention provides a method for device security verification. The method includes: verifying, by a security memory loader executed on a processor of a device after booting of a device is performed, validity of a key for decryption of encrypted firmware in a state in which access to a memory of the device is guaranteed; verifying, by the security memory loader, confidentiality of encrypted firmware stored in a memory of the device by decrypting the encrypted firmware using the key when the key is valid; and verifying, by the security memory loader, authentication and integrity of the decrypted firmware by comparing a signature value generated for the decrypted firmware with an existing signature value.

The verifying of validity of a key may be performed through connection with a one-time programmable memory or a device security management server, and a key value for verifying the validity of the key may be stored in the one-time programmable memory or the device security management server.

The method may further include, before the verifying of validity of the key: performing, by the security memory loader, self-security verification; applying, by the security memory loader of which security is self-verified, a memory protection policy to a memory protection unit of the device, wherein the memory protection unit is initialized; and performing, by the memory protection unit, monitoring of the memory of the device in accordance with the memory protection policy.

The verifying of validity of a key and the verifying of authentication and integrity of the decrypted firmware may be performed based on a virtual trust computing base configured with the secure memory loader, the memory protection unit, and the one-time programmable memory.

The verifying of validity of a key may include: verifying, by the secure memory loader, validity of a first key obtained from the memory of the device in conjunction with the one-time programmable memory or the device security management server; obtaining a third key from a second key stored in the memory of the device using the first key when the first key is valid; and verifying validity of the third key in conjunction with the one-time programmable memory or the device security management server.

The first key may be a confidential root key (CRK) derived from a unique key value of the device, the second key may be a firmware encryption key (FEK) that is wrapped according to an encryption algorithm by the first key, and the third key may be an FEK used to encrypt the firmware.

The verifying of authentication and integrity of the decrypted firmware may include: obtaining, by the secure memory loader, an authentication public key and a signature value for the firmware from the memory of the device; generating, by the secure memory loader, a new signature value for the firmware using the authentication public key and a signature calculation algorithm; and verifying, by the secure memory loader, integrity of the firmware using the generated signature value and an existing signature value stored in the memory of the device.

The generating of a new signature value may include generating a digest value of an original firmware image using the decrypted firmware and a one-way hash function, and generating a new signature value of the original firmware image using the authenticated public key and the generated digest value.

The verifying of integrity of the firmware may include verifying the integrity and authenticity of the firmware according to an elliptic curve digital signature algorithm by using the newly generated signature value and the obtained existing signature value.

The method may further include: receiving, by a memory protection unit of the device, a task request according to an event occurrence from a memory protection process of the decrypted firmware when the event occurs in a state where the decrypted firmware is executed on a processor of the device; determining, by the memory protection unit of the device, whether to allow access to the memory of the device according to the task request based on a memory protection policy stored in the memory of the device; and blocking, by the memory protection unit of the device, the access according to the task request when the task request violates the memory protection policy.

In the receiving of a task request, validity of the memory protection policy may be verified in conjunction with the one-time programmable memory or the device security management server when the event occurs, wherein the determining access to the memory of the device according to the task request and the verification of the memory protection policy validity may be performed based on a virtual trust computing base configured with memory protection process, the memory protection unit, and the one-time programmable memory.

The method may further include, after the blocking of the access according to the task request: transferring control of the device to the secure memory loader by the memory protection process of the firmware; and forwarding, by the secure memory loader, a relevant security violation to the device security management server, and entering into an operation standby state.

The method may further include: providing control of the device to the secure memory loader when the generated signature value is invalid as a result of verifying authentication and integrity of the firmware; forwarding, by the security memory loader, the relevant security violation to a device security management server and entering into an operation standby state; and receiving, by the security memory loader, an encrypted normal firmware image including a firmware update code from the device security management server, wherein the received encrypted normal firmware image may be updated in the memory of the device.

The method may further include, after the performing of self-security verification: forwarding, by the security memory loader, the relevant security violation to a device security management server and entering into an operation standby state; and deleting, by the device security management server, the secure memory loader.

The method may further include, before the verifying of validity of a key, mounting a memory layout including the secure memory loader and an encrypted firmware image on the device.

The mounting may include: generating, by a service providing apparatus, a memory protection policy from an object analysis result of an original firmware image and inserting the generated memory protection policy into an original security memory loader image to generate a first modified security memory loader image; encrypting, by the service providing apparatus, the original firmware image and inserting key information related to the encryption into the first modified security memory loader image to generate a second modified security memory loader image; generating, by the service providing apparatus, a third modified security memory loader image by inserting an authentication public key and a signature value used for authenticating the original firmware image into the second modified security memory loader image; and configuring, by the service providing apparatus, a memory layout including the third modified security memory loader image and the encrypted firmware image and mounting the memory layout on the device.

Another embodiment of the present invention provides a computing device. The computing device includes: a memory configured based on a memory layout including a secure memory loader image and an encrypted firmware image; a processor configured to load and execute the secure memory loader image of the memory; and a memory protection unit processor configured to control access to the memory, wherein the processor is configured to execute the secure memory loader image after booting of the computing device, and wherein self-security verification of a secure memory loader is performed, and validity of a key for decryption is verified in conjunction with a one-time programmable memory or a device security management server by the security memory loader of which security is self-verified, an encrypted firmware stored in the memory is decrypted by the secure memory loader using the key to verify confidentiality of the firmware when the key is valid, and authentication and integrity of the firmware are verified by the secure memory loader by comparing a signature value generated for the decrypted firmware with an existing signature value.

The processor may be configured to verify, by the executed secure memory loader, validity of a confidential root key (CRK) derived from a unique key value stored in the memory of the computing device, and unwrap a wrapped firmware encryption key (FEK) stored in the memory using the CRK to decrypt the encrypted firmware using an original FEK when the CRK is valid.

The processor may be configured to obtain an authentication public key and a signature value for the firmware from the memory by the executed secure memory loader, generate a signature value for the decrypted firmware using the authentication public key and an original firmware image stored in the memory, and verify authentication and integrity of the firmware according to an elliptic curve digital signature algorithm (ECDSA) using the generated signature value and the obtained signature value, and wherein the firmware of which validity may be verified is executed through the processor.

The memory protection unit processor may receive a task request according to an event occurrence by a memory protection process of the firmware while the decrypted firmware is executed on the processor, determine whether to access the memory, and block access to the task request if the task request violates a memory protection policy.

The computing device may further include a network device configured to perform communication through a network, wherein when the self-security verification result of the security memory loader according to the self-security verification is abnormal or the authentication and integrity verification result of the firmware is abnormal, the processor may be configured to notify a device security management server of a relevant security violation through the network device and receive a violation response result from the device security management server in an operation standby state.

The memory may have a layout including a secure memory loader area, a firmware loading memory area, a memory protection unit register value, and a secure memory loader libraries, the secure memory loader area may include a secure memory loader code, a secure memory loader header, a memory protection policy, key information used to encrypt the firmware, and authentication information used to authenticate the firmware, and the firmware loading memory area may represent a space in which a decrypted firmware image is loaded after the encrypted firmware is decrypted with the key.

DETAILED DESCRIPTION OF THE EMBODIMENTS

Figure 1:
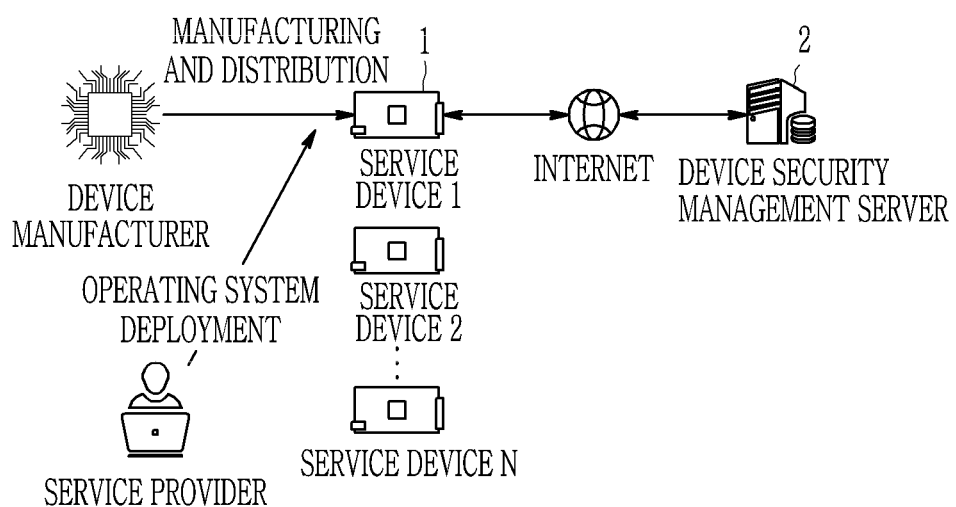
FIG. 1 is an exemplary diagram illustrating a structure of a service network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, when a portion is referred to as including a constituent element, it means that the portion does not exclude another constituent element but may further include another constituent element unless specifically stated otherwise.

Hereinafter, a method and an apparatus for device security verification according to an exemplary embodiment of the present invention will be described.

In the embodiment of the present invention, a memory protection policy for performing a virtual trusted computing base (vTCB) that may be implemented and operated in a computing device supporting low-level computing capability and storage space is generated, and in order to verify the reliability of firmware (or an operating system) in the secure environment according to the memory protection policy before the firmware is loaded, related encryption and authentication keys and signature values are generated and provided to the virtual trust computing base.

FIG. 1 is an exemplary diagram illustrating a structure of a service network according to an exemplary embodiment of the present invention.

In an exemplary embodiment of the present invention, as shown in FIG. 1, a service network based on a low-end computing device is provided. In the service network, a plurality of service devices 1 (service devices 1 to N)

communicate with a device security management server 2 via the Internet (another network may be used).

Equipment manufacturers are collectively referred to as related companies producing individual hardware modules (for example, a microcontroller unit (MCU), a flash memory, a static random access memory (SRAM), peripheral devices, etc.) and boards constituting the service device 1 and manufacturing them to meet specific specifications.

The service provider provides a boot loader, firmware (or an operating system), a service application program, software tools, a development environment, etc. to be loaded and operated in the service device 1 as binary code or an executable file, and may be the subject of a device security management server operation. The service provider may be specifically considered as a specific service providing company, a system developer, a service developer, a security program developer, or a service manager.

In an exemplary embodiment of the present invention, the service device 1 collectively refers to embedded, mobile, and the Internet of Things (IoT) devices that provide usual computing, storage, and communication capabilities. The service device 1 operates with software such as a boot loader, firmware (or an operating system), and a service application program, and operates with a software module and a hardware module such as a secure memory loader (SML), a memory protection process (MPP), a memory protection unit (MPU), a one-time programmable (OTP) memory, and the like in order to satisfy the object of the present invention related to the proposal to be described later. This will be described in more detail below.

The device security management server 2 refers to a trusted remote entity managed by a service provider, and may exist inside or outside the logical service domain constituted by the service devices 1 to N. Particularly, a device security management server existing in the service domain may be referred to as a device security management gateway. In addition, the device security management server 2 may be provided in a single or multiple configurations for each service domain. Further, a hierarchical management structure between device security management servers may be formed and managed accordingly. On the other hand, the device security management server 2 may use a corresponding control means such as device locking, remote deletion, network isolation, firmware forced update, etc. for a service device lacking security.

The Internet may represent a transmission control protocol/internet protocol (TCP/IP)-based Internet environment. In the embodiment of the present invention, it is assumed that secure data communication is performed between service devices and a service device and a device security management server based on mutual authentication, secure key exchange, and encrypted sessions based on a conventional security technology. In detail, mutual authentication and encrypted communication between individual entities may be concluded by conventional techniques (e.g., transport layer security (TLS), datagram transport layer security (DTLS), protocol for carrier authentication for network access (PANA)), and data communication may be performed with ensured confidentiality and integrity under mutual trust between devices.

The formation of individual entities such as a service device, a device security management server, a service provider, and a device manufacturer is not limited to the configuration shown in FIG. 1. In addition, FIG. 1 is briefly shown on the basis of the role of each entity performing a main function in the present invention, and a person having ordinary technical knowledge of computers, networks, security, and hardware may easily understand this.

Figure 2:
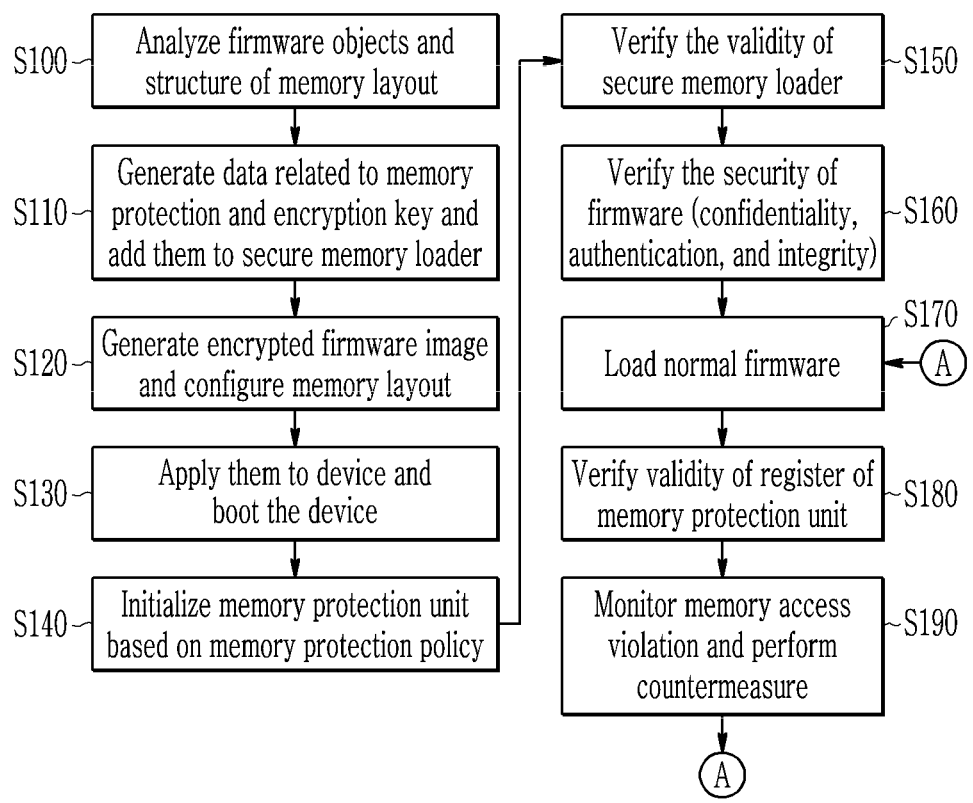
FIG. 2 is a flowchart of a method for device security verification according to an exemplary embodiment of the present invention.

FIG. 2 is a flowchart of a method for device security verification according to an exemplary embodiment of the present invention.

In FIG. 2, each block constituting the flowchart represents a separate execution procedure, and the physical and logical subjects of execution may be specified in detail when the execution procedure of each block is described. This applies equally to all drawings of the flowchart format described below.

As shown in FIG. 2, first, an apparatus of a service provider, that is, a service providing apparatus, performs a process of generating a memory protection policy and applying it to a secure memory loader. Specifically, the service providing apparatus classifies the objects of the firmware by using original firmware image and memory layout configuration information of the original firmware image, and analyzes the type and the memory area address information of the individual objects (S100).

Next, the service providing apparatus generates a key for firmware protection, applies it, and performs firmware image encryption.

Specifically, the service providing apparatus generates data related to memory protection, generates encryption and authentication information related to firmware protection, and adds them to the secure memory loader (S110). The authentication information includes at least one key data for encryption.

The service providing apparatus encrypts the firmware image using the key data of the generated authentication information, and inserts the encrypted firmware image into a flash memory specific area of a service device. In addition, the service providing apparatus inserts two types of security data (the data related to memory protection and the encryption and authentication information generated in S110) generated for protection for the original memory loader and memory and the protection for firmware into the flash memory specific area of the service device, respectively (S120).

The memory layout in which the configuration is completed through the above steps is applied to the service device, and then the system and hardware of the service device are initialized by a booting procedure (S130).

The secure memory loader of the service device initializes a memory protection unit with reference to the memory protection policy loaded in the specific memory area of the flash memory of the service device after being delegated the control from the boot loader or performing the boot function itself (S140). Thereafter, all codes operating within the service device are monitored by the memory protection unit based on the memory protection policy.

The secure memory loader of the service device 1 performs self-security verification by checking its codes, related codes, and related data individually or integrally for each memory area through the one-time programmable memory or the device security management server 2 (S150).

The secure memory loader of the service device 1 extracts key data, verifies the validity of the extracted key data, and decrypts the encrypted firmware stored in the specific area of the flash memory using the validated key data to verify the security of the firmware from the viewpoint of confidentiality after the self-security verification has passed. If the decryption of the firmware is performed normally and the firmware is copied to the firmware operation area of the flash memory normally, the security of the copied firmware is verified in terms of authentication and integrity (S160).

When firmware security verification is normally completed, the firmware loading procedure is performed. At this time, an initialization procedure of the memory protection unit and the memory protection process is included (S170).

After the normal loading of the firmware, the memory protection process of the service device 1 verifies the validity of the memory protection policy. Specifically, when a preset event such as task context switching occurs, the memory protection process verifies the validity of the memory protection policy (S180).

The memory protection process of the service device always confirms through the memory protection unit whether the current task causes a memory access violation. In the event of a security problem such as a memory defect, exception, error, or damage, the memory protection process aborts the firmware execution and transfers all control to the secure memory loader. The secure memory loader of the service device 1 notifies the device security management server 2 of the occurrence of a security problem, and then follows the corresponding procedure (S190).

As described above, in the embodiment of the present invention, a memory protection policy for a secure memory loader capable of acting as a virtual trust computing base (vTCB) for a service device that is a low-end computing device in which a hardware trust computing base does not exist is generated, and related encryption and authentication information (encryption and authentication key, signature value, and the like) is generated and provided to the secure memory loader, in order to verify whether the firmware (or operating system) is reliable in a secure environment before the firmware is loaded according to the generated memory protection policy. In the service device to which the memory layout including the secure memory loader is applied, the secure memory loader acquires the control and performs self-security verification at the same time. If there is no abnormality, the memory protection unit is initialized by using the generated memory protection policy, the confidentiality is verified by decrypting the encrypted firmware with a valid encryption key in an environment where memory access control is secured, and then authentication and integrity verification of the decrypted firmware is performed by comparing signature values. Through this process, the firmware normally loaded by the secure memory loader acquires control of the code execution, and monitors whether the task to be executed based on the memory protection process causes the memory access violation, through the memory protection unit. When an event of a violation of the memory protection policy such as modification, access, or damage, or a firmware defect, occurs in the monitoring, the firmware transfers all control to the secure memory loader and notifies the device security management server of the violation or the defect so that a countermeasure may be taken according to the type of violation or defect.

Next, each process included in the method for device security verification according to the embodiment of the present invention, which is performed as described above, will be described in more detail.

First, the process of creating and applying a memory protection policy in the method for device security verification according to an embodiment of the present invention will be described in more detail.

Figure 3:
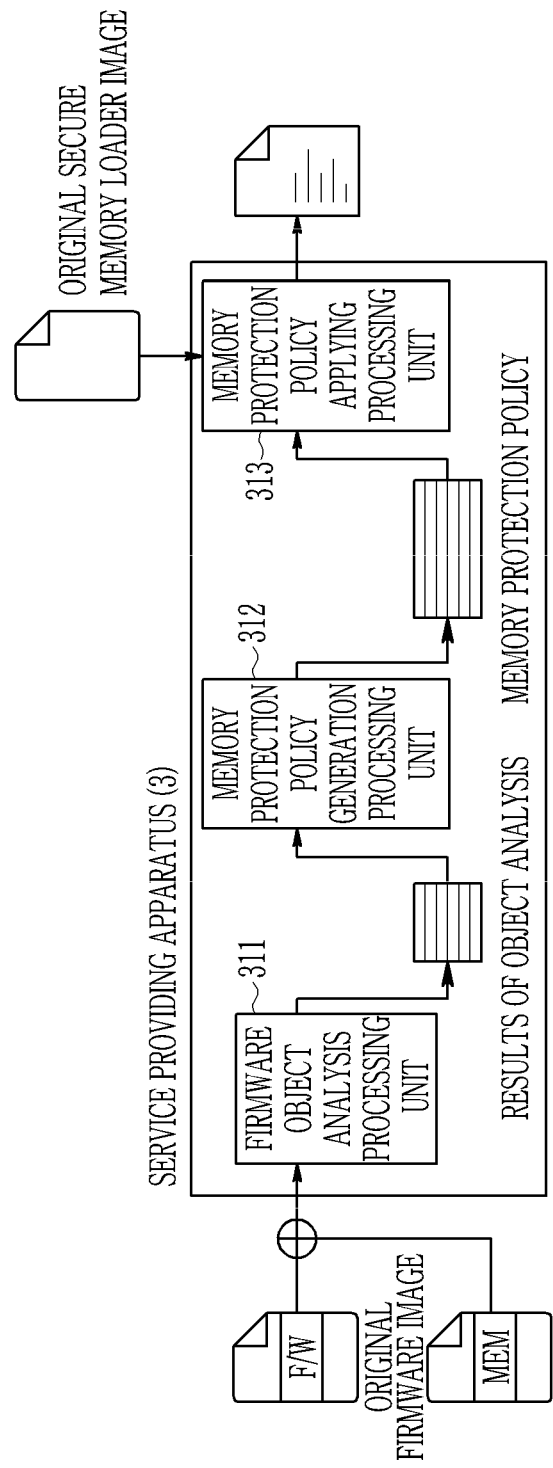
FIG. 3 is a diagram illustrating an example of a memory protection policy generation and application process through firmware object analysis in a method for device security verification according to an exemplary embodiment of the present invention, and a structure of a service providing apparatus for performing such a process.

FIG. 3 is a diagram illustrating an example of a memory protection policy generation and application process through firmware object analysis in a method for device security verification according to an exemplary embodiment of the present invention, and a structure of a service providing apparatus for performing such a process.

The process of FIG. 3 may be performed only by a service providing apparatus which is a device of a service provider having a specific authority and service policy, and may be performed offline. Therefore, it cannot be infringed or arbitrarily modified by a general system program developer. In order to perform the process of FIG. 3 for an operating system image file modified by a third company or a system developer, it is assumed that a relevant license (e.g., a key or a specific serial number) for the operating system image file is acquired from a service provider. In addition, the arbitrarily modified memory protection policy is continuously monitored by the device management security server so that it is possible to solve the security defect problem due to arbitrary modification.

As shown in FIG. 3, the service providing apparatus 3 includes a firmware object analysis processing unit 311, a memory protection policy generation processing unit 312, and a memory protection policy applying processing unit 313. Each unit may be composed of software, hardware, or a combination of software and hardware.

An original firmware image, an original secure memory loader image, and a first modified secure memory loader image may be binary data or files existing in the database. In case of a file, it may exist in a standard such as an executable and linkable format (ELF), a binary (Bin) format, or a hexadecimal (Hex) format. Further, the images may be stored and processed in a format other than the above-described form or standard, as necessary.

Specifically, the original firmware image represents a hexadecimal image file of firmware or operating system for a specific device operation developed or provided by a service provider. Generally, firmware (or an operating system) is used for system initialization, kernel module loading, hardware driver module loading, user task loading, data memory configuration (a stack or a heap), task generation and scheduling, networking, input/output (I/O) device control, interrupt control, and so on. In particular, in the embodiment of the present invention, it is assumed that the firmware includes a separate system kernel module called a memory protection process, which will be described later.

Memory layout configuration information represents a file containing memory structure information of the original firmware image. For example, it may be a memory map file generated when an original firmware source code is compiled.

The firmware object analysis processing unit 311 receives the original firmware image and the memory layout configuration information as input data, classifies the objects constituting the firmware, determines the type of the classified object, and then analyzes the memory address area of the objects. The results of the object analysis are obtained according to the analysis processing of the firmware object analysis processing unit 311. The results of the object analysis may be as shown in Table 1 below.

TABLE 1

| Object | Type classification | Address range |
| --- | --- | --- |
| Object 1 | System initialization code | 0X00080000~0x0008FFFF |
| Object 2 | Booting code | 0x00090000~0x00090FFF |
| Object 3 | Secure memory loader | 0x00091000~0x000913FF |
| Object 4 | Kernel thread | 0x00091400~0x000917FF |
| Object 5 | User thread | 0x00091800~0x000919FF |
| Object 6 | Kernel module | 0x00091A00~0x000921FF |
| Object 7 | Driver module | 0x00092A00~0x000931FF |
| Object 8 | Memory protection process | 0x00094A00~0x00094BFF |
| Object 9 | Secure memory loader's stack | 0x20070000~0x2007001F |

TABLE 1-continued

| Object | Type classification | Address range |
|---|---|---|
| Object 10 | Memory protection process's stack | 0x20070020~0x2007003F |
| Object 11 | User thread's stack | 0x20070040~0x2007005F |

The memory protection policy is a result indicating a memory area accessible for each object generated by the memory protection policy generation processing unit 312 and an authority for an operation that may be performed on the memory area.

The memory protection policy may be configured as shown in Table 2 below.

TABLE 2

| Object | Type classification | Address range | Accessible memory area | Access right |
|---|---|---|---|---|
| Object 1 | System initialization code | 0X00080000~0x0008FFFF | Object 13 (Flash) Object 14 (RAM) Object 13 (OTP) . . . | RO, X RW, X RO, NX . . . |
| Object 2 | Booting code | 0x00090000~0x00090FFF | 0x000B0000~0x000B03FF | |
| Object 3 | Secure memory loader | 0x00091000~0x000913FF | Object 9 Object 12 0x000A0000~0x000A1FFF | RW, NX RO, NX RO, NX |
| Object 4 | Kernel thread | 0x00091400~0x000917FF | Object 6 | RW, NX |
| Object 5 | User thread | 0x00091800~0x000919FF | Object 11 | RW, NX |
| Object 6 | Kernel module | 0x00091A00~0x000921FF | Object 7 | RO, X |
| Object 7 | Driver module | 0x00092A00~0x000931FF | 0x000C100~0x000C1FF | RO, X |
| Object 8 | Memory protection process | 0x00094A00~0x00094BFF | Object 10 Object 12 | RO, NX RO, NX |
| Object 9 | Secure memory loader's stack | 0x20070000~0x2007001F | — | — |
| Object 10 | Memory protection process's stack | 0x20070020~0x2007003F | — | — |
| Object 11 | User thread's stack | 0x20070040~0x2007005F | — | — |
| Object 12 | Memory protection registers | 0x000C0000~0x000C001F | — | — |
| Object 13 | Hardware - Flash | 0x00080000~0x000FFFFF | — | — |
| Object 14 | Hardware - SRAM | 0x20070000~0x20087FFF | — | — |
| Object 15 | Hardware - OTP | 0x30000000~0x300003FF | — | — |
| . . . | . . . | . . . | . . . | . . . |

TABLE 1-continued

| Object | Type classification | Address range |
|---|---|---|
| Object 12 | Memory protection registers | 0x000C0000~0x000C001F |
| Object 13 | Hardware - Flash | 0x00080000~0x000FFFFF |
| Object 14 | Hardware - SRAM | 0x20070000~0x20087FFF |
| Object 15 | Hardware - OTP | 0x30000000~0x300003FF |
| . . . | . . . | . . . |

The result of the object analysis in Table 1 is an arbitrary example, and the present invention is not limited thereto.

The results of the object analysis may include an object, a type classification, and an address range. The object constitutes the firmware. As shown in Table 1, the name of the object may be distinguished by serial numbers for convenience of classification.

The type classification is a classification of individual types of objects. In Table 1, a kernel thread, a user thread, a kernel module, and a driver module, each of which may be configured in plural, are respectively represented as one object for convenience of explanation.

The address range is an address of a memory area containing an individual object. In Table 1, arbitrary addresses that simply linearly increase are entered to facilitate understanding.

Meanwhile, the memory protection policy generation processing unit 312 receives the results of the object analysis as inputs, and generates a memory protection policy.

The memory protection policy of Table 2 is an arbitrary example for convenience of understanding, and the present invention is not limited thereto.

The memory protection policy includes an object, a type classification, an address range, an accessible memory area, and an access right.

The object, the type classification, and the address range are the same as the results of the object analysis, so detailed description is omitted herein.

The accessible memory area represents which code or data memory area an object can access. That is, it represents the system resources (code, stack, heap, peripheral registers, etc.) that the object can access. Access to areas not described in the accessible memory area for each object is blocked. It is possible to designate a specific memory address range rather than an object in the accessible memory area. It is also possible to set a wider address area where a plurality of objects are located.

The access right represents that an object may access system resources belonging to an accessible address area with a certain authority. In one embodiment, the access rights may be classified as "Read Only (RO)", "Read and Write (RW)", "Executable (X)" and "Non-Executable (NX)". A separate authority defined by the service provider may be added in addition to the access authority described in this embodiment. Memory access control may be performed according to the object access control rule and the permission setting according to the memory protection policy. For example, in Table 2, the Object 9 (a flash memory) area may be set to enable only "read and execute", and at the same time, the Object 6 (a kernel module) included in a part of the flash memory may be set to block the access of codes from other memory areas.

In Table 2, data memory objects such as the Object 9 to the Object 12 and hardware objects such as the Object 13 to the Object 15 are not included in the memory protection policy, but are blurred for convenience of explanation without deleting.

The memory protection policy applying processing unit 313 adds the memory protection policy generated by the memory protection policy generation processing unit 312 as the metadata of the original secure memory loader to generate a modified secure memory loader image. As an example, a series of procedures for generating a specific memory segment with reference to an executable and loadable file (ELF) specification, inserting a memory protection policy into the corresponding segment, and converting them into a hexadecimal or binary file are performed, so that a modified secure memory loader image to which the memory protection policy is added may be generated. The modified secure memory loader image is referred to as a first modified secure memory loader image for convenience of explanation.

The original secure memory loader image represents a secure memory loader hexadecimal image file developed and provided by a service provider. The original secure memory loader image may include a boot loader code and data according to the needs of the service provider. In addition, when a boot ROM is mounted in the service device, it is usual that a basic boot code operates in the boot ROM. However, since a device manufacturer typically provides a framework for stopping the basic boot code and driving a customized bootloader implemented in a flash memory, and the location of the boot code may be flexibly determined by the service provider's policy.

On the basis of the structure as described above, as shown in FIG. 3, the service providing apparatus 3 classifies the objects constituting the firmware on the basis of the original firmware image and the memory layout configuration information, determines the type of the classified object, and then analyzes the memory address area of the objects. Based on the results of the analysis, a memory protection policy is generated, and the generated memory protection policy is applied to the original secure memory loader image to obtain a first modified secure memory loader image.

Hereinafter, a process of generating a key for firmware protection and applying it in the method for device security verification according to an embodiment of the present invention will be described.

Figure 4:
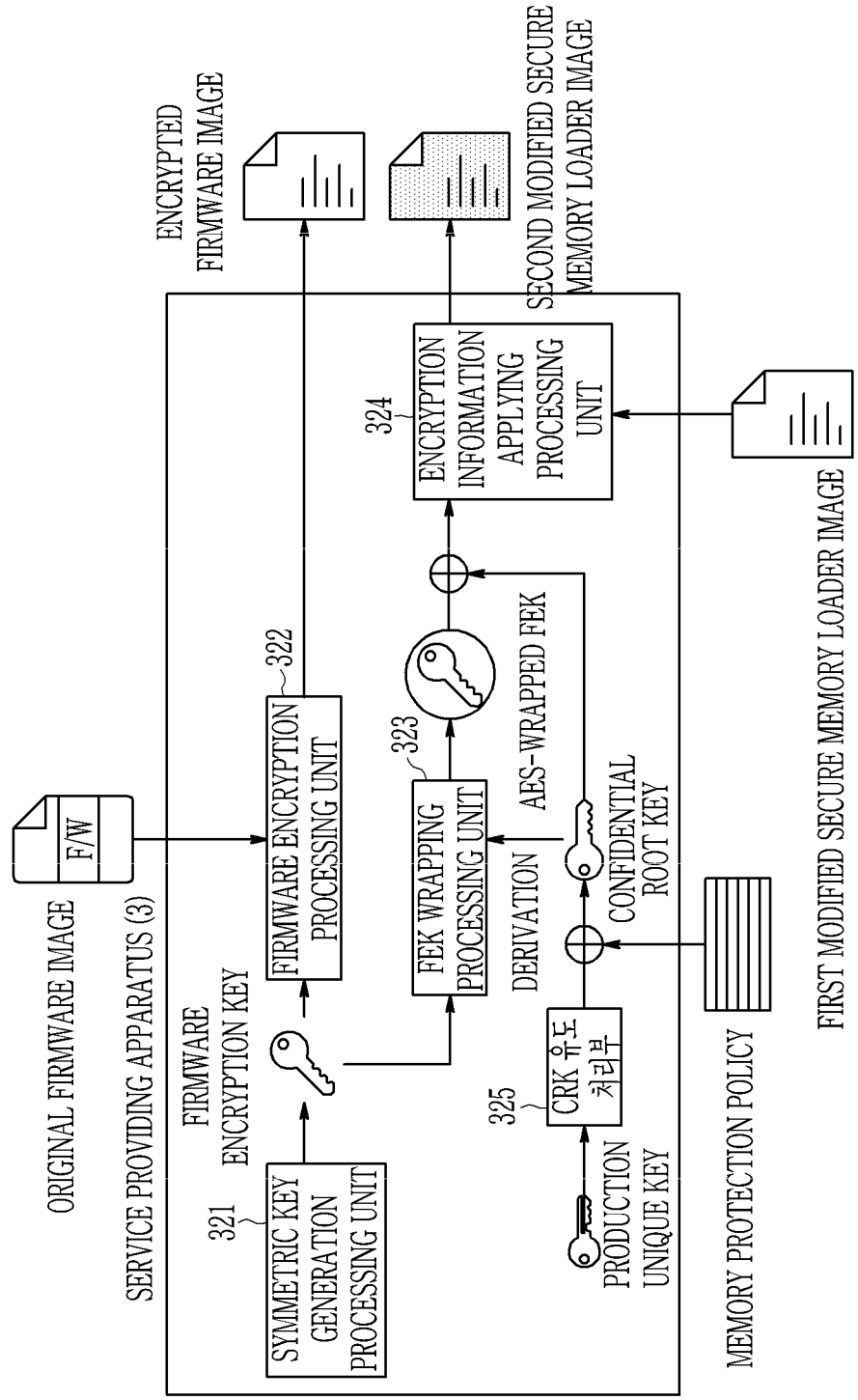
FIG. 4 is a diagram illustrating an example of a process of generating and deriving a key for firmware protection, applying the key to a secure memory loader image, and encrypting a firmware image in a method for device security verification according to an exemplary embodiment of the present invention and a structure of a service providing apparatus for performing such a process.

FIG. 4 is a diagram illustrating an example of a process of generating and deriving a key for firmware protection, applying the key to a secure memory loader image, and encrypting a firmware image in a method for device security verification according to an exemplary embodiment of the present invention and a structure of a service providing apparatus for performing such a process.

In FIG. 4, an original firmware image, an encrypted firmware image, a first modified secure memory loader image, and a second modified secure memory loader image may be binary data or files existing in the database, and in case of a file, they may be exist in a standard such as the ELF, the Bin, the Hex, or the like. Further, the images may be stored and processed in a format other than the above-described form or standard, as necessary. The description of the original firmware image, the memory protection policy, and the first modified secure memory loader may be referred to in the description of FIG. 3 described above, and a detailed description thereof will be omitted here. In FIG. 4, it is assumed that all the input data, output data, and intermediate output data generated by the service provider may be stored and managed in the device security management server, and may be calculated and generated on their own.

As shown in FIG. 4, the service providing apparatus 3 further includes a symmetric key generation processing unit 321, a firmware encryption processing unit 322, a firmware encryption key (FEK) wrapping processing unit 323, an encryption information applying processing unit 324, and a confidential root key (CRK) derivation processing unit 325. Each unit may be composed of software, hardware, or a combination of software and hardware.

The symmetric key generation processing unit 321 generates a symmetric key for performing the encryption and decryption of firmware. For example, a symmetric key may be generated by considering an advanced encryption standard (AES) algorithm scheme. A FEK represents a symmetric key for firmware encryption processing generated by the symmetric key generation processing unit 321.

The firmware encryption processing unit 322 encrypts the original firmware image using the symmetric key FEK generated by the symmetric key generation processing unit 321. Thus, an encrypted firmware image is produced as a result. The encrypted firmware image may be, for example, the result of encrypting a file consisting of a hexadecimal string.

The FEK wrapping processing unit 323 wraps the symmetric key FEK using an encryption algorithm (e.g., AES) scheme. Due to the key wrapping function performed in the FEK wrapping processing unit 323, the secure memory loader may confirm whether the integrity of the FEK is maintained or damaged. In FIG. 4, the AES-wrapped FEK represents the FEK wrapped based on the AES encryption algorithm by the FEK wrapping processing unit 323.

The AES-wrapped FEK may include separate integrity information. The encryption information applying processing unit 324 configures encryption information based on the key (the AES-wrapped FEK) input from the FEK wrapping processing unit 323 and CRK data input from the CPK derivation processing unit 325, and generates the second modified secure memory loader by applying the encryption information to the first modified secure memory loader. As an example, a series of procedures for generating a specific memory segment with reference to the conventional ELF specification, inserting the encryption information into the segment, and converting it into a hexadecimal or binary file may be considered. The second modified secure memory loader image represents the final generated secure memory loader image to which the encryption information is applied.

The CRK derivation processing unit 325 derives the CRK from a production unique key (PUK). The PUK represents the device unique key value provided by a device manufacturer. It is assumed that the key values of the PUK are reliably delivered, processed, and archived to the service provider only through the normal inter-company contract and licensing procedure. The CRK is a confidential root key, and is transferred to the FEK wrapping processing unit 323 and the encryption information applying processing unit 324. Here, a plurality of key values may be generated and managed for each of service devices or firmware versions according to a service provider's policy.

On the basis of the structure as described above, as shown in FIG. 4, the service providing apparatus 3 generates a symmetric key for performing the encryption and decryption of firmware, and encrypts the original firmware image by using the generated symmetric key. Then, the service providing apparatus 3 wraps the symmetric key using an encryption algorithm, where the symmetric key is wrapped using the CRK derived from the PUK. Subsequently, the service providing apparatus 3 configures the encryption information based on the wrapped symmetric key and the CRK, and applies the encryption information to the first modified secure memory loader to generate the second modified secure memory loader.

Next, a process of generating authentication information for protecting the firmware and applying it to the secure memory loader image in the method for device security verification according to the embodiment of the present invention will be described.

Figure 5:
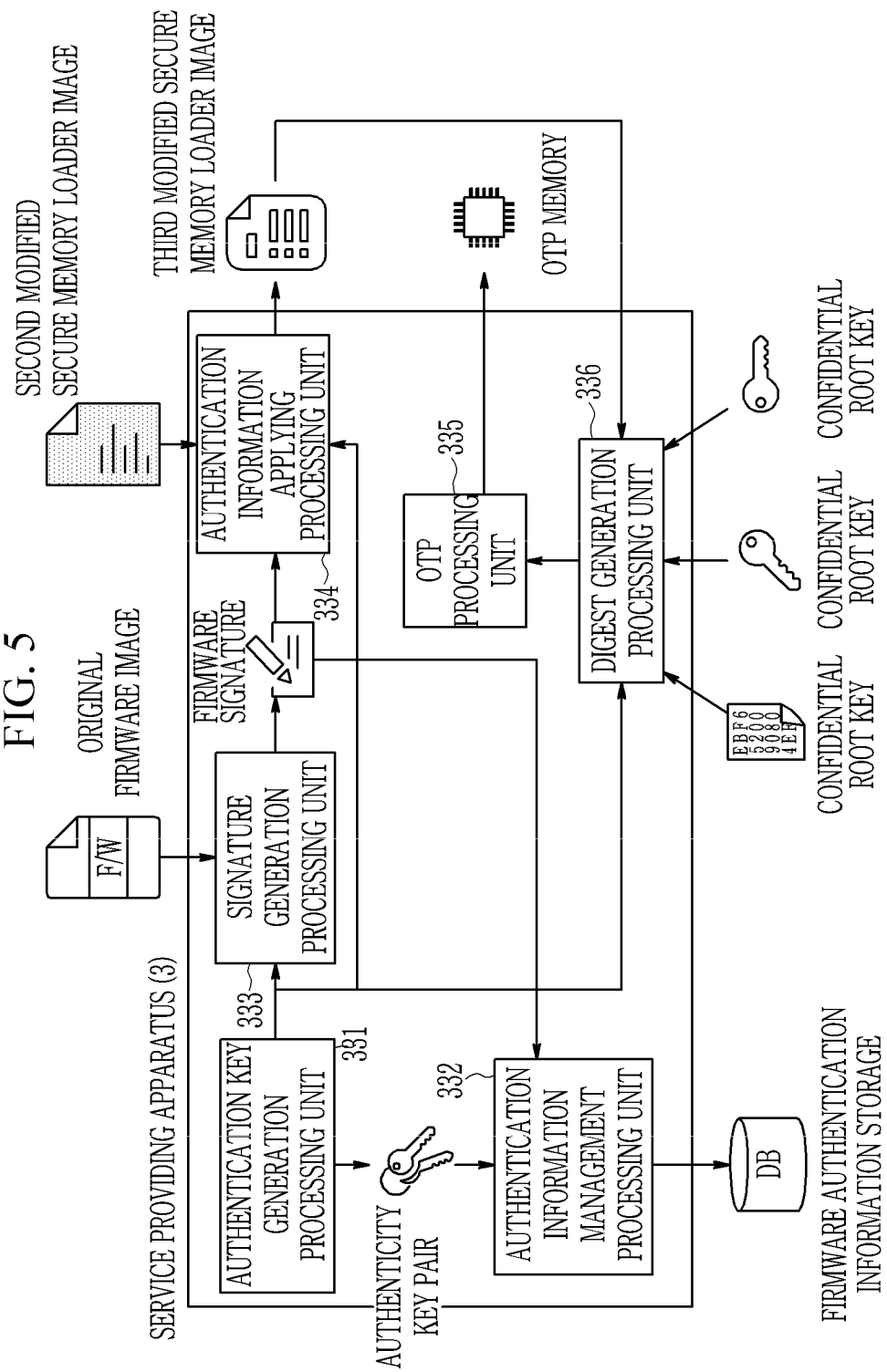
FIG. 5 is a diagram illustrating an example of a process of generating authentication information for protecting firmware, applying the generated authentication information to a secure memory loader image, and storing related security data in a one-time password (OTP) memory in a method for device security verification according to an exemplary embodiment of the present invention and a structure of a service providing apparatus for performing such a process.

FIG. 5 is a diagram illustrating an example of a process of generating authentication information for protecting firmware, applying the generated authentication information to a secure memory loader image, and storing related security data in a one time password (OTP) memory in a method for device security verification according to an exemplary embodiment of the present invention and a structure of a service providing apparatus for performing such a process.

In FIG. 5, the original firmware image and the second modified security memory loader image may be binary data or a file existing in the database, and may exist in a standard such as ELF, Bin, or Hex in case of a file. Further, the image may be stored and processed in a format other than the above-described form or standard, as necessary. The description of the original firmware image, the second modified secure memory loader, the FEK, and the CRK may be referred to in the description of FIG. 4, and a detailed description thereof will be omitted here. In FIG. 5, it is assumed that all the input data, output data, and intermediate output data generated by the service provider may be stored and managed in the device security management server, and may be calculated and generated on their own.

As shown in FIG. 5, the service providing apparatus 3 includes an authentication key generation processing unit 331, an authentication information management processing unit 332, a signature generation processing unit 333, an authentication information applying processing unit 334, a one-time programmable (OTP) processing unit 335, and a digest generation processing unit 336. Each unit may be composed of software, hardware, or a combination of software and hardware.

The authentication key generation processing unit 331 generates a pair of authentication keys for generating firmware signature information. In one example, a pair of authentication keys may be generated using an elliptic curve digital signature algorithm (ECDSA), and then its validity may be verified. The authentication key pair in FIG. 5 represents a pair of authentication keys generated by the authentication key generation processing unit 331.

The authentication key generation processing unit 331 provides the public key of the authentication key pair to the signature generation processing unit 333, the authentication information applying processing unit 334, and the digest generation processing unit 336. The authentication information management processing unit 332 stores the authentication key pair in a firmware authentication information storage. In one example, the authentication key pair may be processed and stored based on a standard such as privacy enhanced mail (PEM).

The authentication information management processing unit 332 supports a key storage standard that is normally used in addition to the PEM. The firmware authentication information storage represents a database or a set of files for storing a pair of authentication keys. It is assumed that the firmware authentication information storage is managed and archived based on a secure manner by the service provider.

The signature generation processing unit 333 receives the original firmware image as input data, and generates a firmware signature value using the public key of the authentication key pair, that is an authentication public key. In addition, the signature generation processing unit 333 may verify the security validity of data according to a standard such as an elliptic curve digital signature algorithm (ECDSA). In one example, the signature data may be processed and stored based on a standard such as distinguished encoding rules (DER). The signature generation processing unit 333 supports a standard that is commonly used for storing the signature data in addition to the DER. In FIG. 5, the firmware signature represents a firmware signature value generated by the signature generation processing unit 333. The generated firmware signature value is provided to the authentication information management processing unit 332, and finally stored and managed in the firmware authentication information storage.

The authentication information applying processing unit 334 adds the authentication information including the firmware signature value and the authentication public key to the second modified security memory loader image to finally generate the third modified security memory loader image. As an example, a series of procedures for generating a specific memory segment with reference to the conventional ELF specification, inserting the encryption information into the segment, and converting it into a hexadecimal or binary file are performed to generate the third modified security memory loader image. The third modified security memory loader image represents the security memory loader image finally generated by the authentication information applying processing unit 334.

The OTP generation processing unit 335 stores a digest value input from the digest generation processing unit 336 in the one-time programmable memory, that is, the OTP memory.

The digest generation processing unit 336 generates the digest value by performing one-way hash of the input data, and transfers the generated digest value to the OTP generation processing unit 335. The digest generation processing unit 336 may selectively use crypto & network codes (CNC), the FEK, the CRK, and the like as input values as necessary. The CNC represents a cryptographic code library and a network code library to be dedicated by the third modified secure memory loader. The CNC may be placed in a specific memory area on the flash memory described below.

The OTP memory represents a one-time programmable memory hardware module. The OTP memory, like an eFuse memory, has a structural feature that locks after writing once, allowing only read access. It is assumed that a function of writing to the OTP memory is possible only through special external software or hardware tools developed by the service provider, and that a reading function may also be performed only by methods planned or designed by the service provider.

Based on the structure as described above, as shown in FIG. 5, the service providing apparatus 3 generates an authentication key pair for generating firmware signature information, and generates a firmware signature value by using the authentication public key of the authentication key pair based on the input original firmware image. Then, the service providing apparatus 3 adds the authentication information composed of the firmware signature value and the authentication public key to the second modified security memory loader image to finally generate the third modified security memory loader image. The service providing apparatus 3 also generates a digest value and stores it in the OTP memory.

The third modified security memory loader image is generated through the process described above, and then is applied to the service device.

The process of configuring the security memory loader and the memory layout by the service providing apparatus through the processes described with reference to FIGS. 3 to 5 will be described in more detail as follows.

Figure 6:
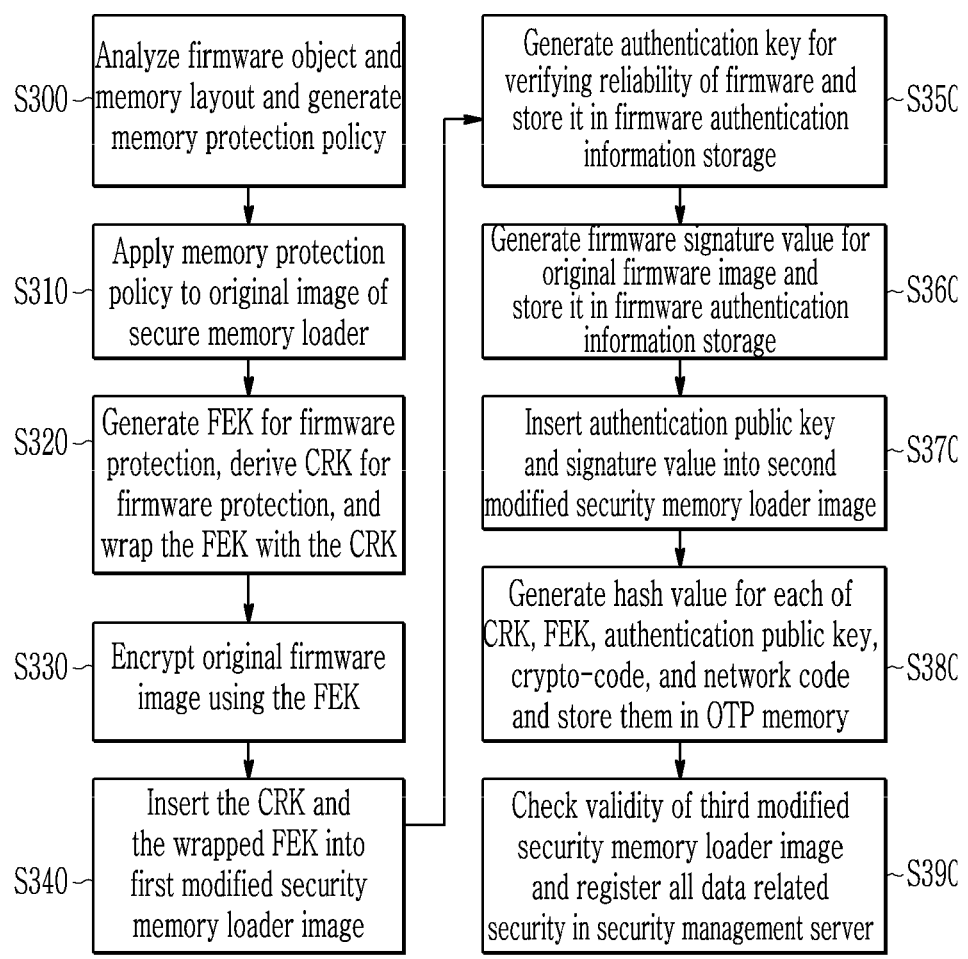
FIG. 6 is a flowchart illustrating a process of configuring a secure memory loader and a memory layout by a service providing apparatus according to an exemplary embodiment of the present invention.

FIG. 6 is a flowchart illustrating a process of configuring a secure memory loader and a memory layout by a service providing apparatus according to an exemplary embodiment of the present invention.

As shown in FIG. 6, the service providing apparatus 3 analyzes firmware objects using original firmware image and memory layout configuration information, and primarily derives the results of the object analysis. Thereafter, the service providing apparatus 3 generates a memory protection policy based on the derived object analysis result (S300).

The service providing apparatus 3 further applies the generated memory protection policy to the original image of the secure memory loader (S310).

The service providing apparatus 3 generates the FEK for firmware protection, derives the CRK for firmware protection from the PUK, and wraps the FEK with the CRK using the encryption algorithm scheme such as the AES (S320).

The service providing apparatus 3 encrypts the original firmware image using the generated FEK to obtain an encrypted firmware image (S330), and inserts the firmware encryption information such as the CRK and the wrapped FEK into the first modified security memory loader image (S340). Then, the service providing apparatus 3 generates an authentication key pair for verifying the reliability of the firmware in terms of authentication and integrity, and stores it in the firmware authentication information storage (S350).

The service providing apparatus 3 calculates a firmware signature value for the original firmware image using an algorithmic scheme such as the ECDSA, and stores the firmware signature value in the firmware authentication information storage (S360).

Thereafter, the service providing apparatus 3 inserts the firmware authentication information such as the authentication public key and the firmware signature value into the second modified security memory loader image to obtain the third modified security memory loader image (S370).

On the other hand, the service providing apparatus 3 generates a digest value by performing one-way hash on the CRK, the FEK, the authentication public key, and the crypto-code and the network code (CNC described in FIG. 5), which are used by the secure memory loader, and then stores the digest value in the OTP memory. Then, the digest value is locked (S380).

The service providing apparatus 3 checks whether the configuration requirements of the third modified security memory loader image are violated from the standard specification or the format prescribed by the service provider in terms of availability, and registers all the data generated in the above steps 300 to 3780 in the security management server (S390).

The third modified security memory loader image is generated through the process described above, and then is applied to the service device.

Figure 7:
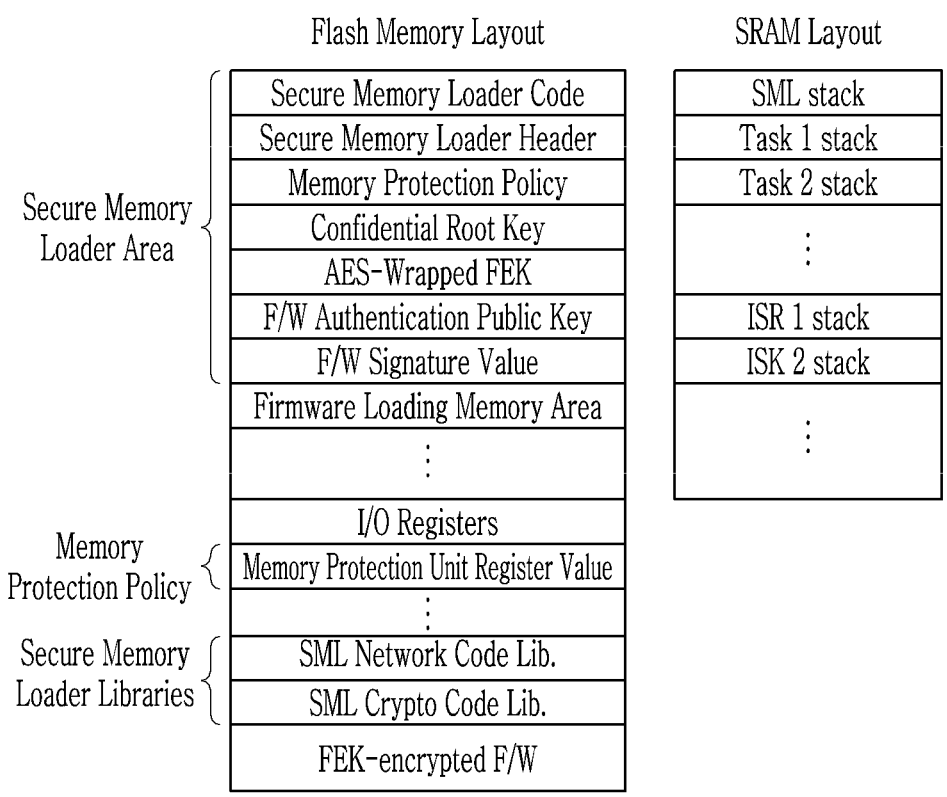
FIG. 7 is a diagram illustrating a memory layout of a service device equipped with a virtual trust computing base function according to an exemplary embodiment of the present invention.

FIG. 7 is a diagram illustrating a memory layout of a service device equipped with a virtual trust computing base function according to an exemplary embodiment of the present invention.

Individual objects constituting the layout of a flash or static random access memory (SDRAM) may be arranged and operated in the memory by a configuration other than in the embodiment shown in FIG. 5. However, in FIG. 7, it is described that individual objects are arranged linearly in the memory to facilitate understanding.

In an embodiment of the present invention, a flash memory chip, which may be composed of a plurality of banks, is constituted by a linear memory arrangement in order to facilitate understanding, and accordingly, a flash memory layout is as shown in FIG. 7.

The flash memory layout includes a secure memory loader area, a memory protection policy, and a secure memory loader library, and further includes a firmware loading memory area, an I/O register, and firmware encrypted with the FEK (FEK-encrypted F/W).

The secure memory loader area includes objects such as a secure memory loader code, a secure memory loader header, a memory protection policy, a CRK, a wrapped key, an authentication public key, a firmware signature value, and the like.

The secure memory loader code includes a memory protection policy applying code and a memory protection unit driver code. The secure memory loader header includes metadata that is basically referred to by the secure memory loader code in performing its functions. The memory protection policy is policy data for protecting the firmware added to the flash memory by the memory protection policy generation processing unit and the memory protection policy applying processing unit of FIG. 3. Separately from the secure memory loader header, the secure memory loader code may operate with reference to the memory protection policy. The CRK represents a secret root key value derived from the PUK by the CRK derivation processing unit of FIG. 4. The wrapped key (an AES-wrapped FEK) represents a key value wrapped by the FEK wrapping processing unit of FIG. 4, and may include separate integrity data. The authentication public key (an F/W authentication public key) represents a value of the public key of the authentication key pairs generated by the authentication generation processing unit in FIG. 5. The firmware signature value (an F/W signature value) represents a firmware signature value generated by the signature generation processing unit of FIG. 5.

The firmware loading memory area represents a separate flash memory space for performing the function as firmware after the firmware encrypted with the FEK key is decrypted, that is a space in which a decrypted firmware image is loaded after the encrypted firmware is decrypted. The firmware loading memory area is automatically deleted when a central processing unit (CPU) is reset, and is recognized by the secure memory loader as an empty idle space at boot time.

An I/O register is a register that contains data related to the operation of various I/O peripheral devices. Typically, I/O peripheral devices mounted on a low-end computing device have a feature that arranges registers associated with their performance in a specific area of the flash memory according to a memory-mapped I/O technique.

The memory protection unit register value is used to determine whether access to a particular code memory or data memory is allowed, and if so, which right is valid in accessing when the memory protection unit of the service device is operating. The memory protection unit register represents a space in which the memory protection policy data referenced by the memory protection unit of the service device is stored. It is assumed that the memory protection unit register value can not be arbitrarily accessed or modified by a user task or a system task, and is writable only by a secure memory loader having the highest CPU privilege.

The secure memory loader library includes a simple macro language (SML) network code library (a Network Code Lib) and an SML crypto code library (a Crypto Code Lib). The SML network code library represents a network-related code library used by the secure memory loader. Such a code library may be included and operated in the security memory loader according to the policy of the service provider or as needed. The SML crypto code library represents a code library that is related to encryption processing and is used by the secure memory loader. Such a code library may be included and operated in the security memory loader according to the policy of the service provider or as needed.

The firmware encrypted with the FEK (FEK-encrypted F/W) may include the firmware authentication public key and the firmware signature value in a separate memory segment format as required by the service provider's policy or as required.

In the embodiment of the present invention, the SRAM memory chip, which may be composed of a plurality of banks, is configured as a linear memory arrangement in order to facilitate understanding, and the SRAM layout according to the SRAM memory chip is as shown in FIG. 7.

The SRAM layout includes an SML stack, a task stack, and an interrupt service routine (ISR) stack.

The SML stack represents a dedicated stack memory area used by the secure memory loader. Access to the SML stack may be specified in the memory protection policy to be possible only by the secure memory loader, and according to this memory protection policy, the memory protection unit of the service device monitors and blocks illegal attempts to access the SML stack.

The task stack includes a Task 1 stack and a Task 2 stack, which represents a stack memory area used by a user included in the firmware or a system task 1 and a task 2 after the firmware is normally loaded. The task stack is further described to help understand the general configuration of the SRAM.

The ISR stack includes an ISR 1 stack and an ISR 2 stack, which represents a stack memory area used by an interrupt service routine (ISR) for handling interrupts when a certain interrupt has occurred after the firmware is normally loaded. The ISR stack is further described to help understand the configuration of the SRAM.

Next, a service device to which the above-described memory layout is applied will be described.

Figure 8:
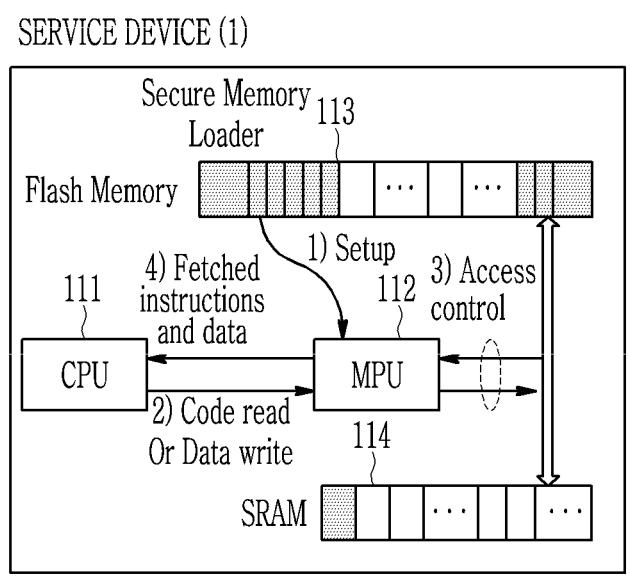
FIG. 8 is a diagram illustrating a structure of a service device and an access control process in a secure memory loader operation of a primary virtual trust computing base configured by a secure memory loader, a memory protection unit, and a one-time programmable memory based on the structure according to an exemplary embodiment of the present invention.

FIG. 8 is a diagram illustrating a structure of a service device and an access control process in a secure memory loader operation of a primary virtual trust computing base configured by a secure memory loader, a memory protection unit, and a one-time programmable memory based on the structure according to an exemplary embodiment of the present invention.

The service device 1 includes a central processing unit (CPU) 111, a memory protection unit (MPU) 112, a flash memory 113, and an SRAM 114.

The flash memory 113 and the SRAM 114 may have the layout as shown in FIG. 7. The memory areas shown in gray in the flash memory 113 and the SRAM 114 represent code or data related to the secure memory loader.

In the secure memory loader operation of the flash memory 113, virtual trust computing is configured. Specifically, in the initial operation of the secure memory loader immediately after booting of the service device 1, the virtual trust computing is configured by a secure memory loader, a memory protection unit, and a one-time programmable memory (OTP memory). In addition, the memory protection unit is initialized and operates in accordance with the memory protection policy of the secure memory loader area described above in FIG. 7.

In the service device 1 having such a structure, in the security memory loader operation of the flash memory 113, the memory protection unit 112, which is one of the elements constituting the virtual trust computing base, performs memory monitoring and access control operations.

One embodiment will be described focusing on how the memory protection policy and the memory protection unit realizes memory access control at the beginning of the operation of the secure memory loader.

The memory protection policy that the memory protection unit 112 should refer to is reflected in a memory protection unit register by the secure memory loader located at the first part of the flash memory 113. Thereafter, the secure memory loader initializes the memory protection unit 112 (step 1).

The case in which a task (such as a task illegally acquiring the control or malicious code illegally added to the security memory loader) tries to access the specific code of the flash memory 113 or to modify the specific data of the SRAM 114 may occur. When such a case occurs, the CPU 111 requests the reading of the code located in the specific area of the flash memory 113 or the changing of the data located in the specific area of the SRAM 114. The associated task request is first transferred to the memory protection unit 112. The memory protection unit 112 determines whether the access according to the task request is permitted, and which right is granted in the access according to the memory protection policy set in the flash memory 113 (step 2).

If the task request does not violate the memory protection policy, the CPU 111 performs access to the corresponding memory area according to the task. However, if the task request violates the memory protection policy, that is, the access according to the task request is impossible according to the memory protection policy, the task request is blocked by the access control function performed by the memory protection unit 112 (step 3).

If a memory access according to the task request is permitted, the related command and data may be returned to the CPU 111. If the memory access according to the task request is not permitted, the memory protection unit 112 recognizes the access control violation and notifies the secure memory loader thereof (step 4).

Figure 9:
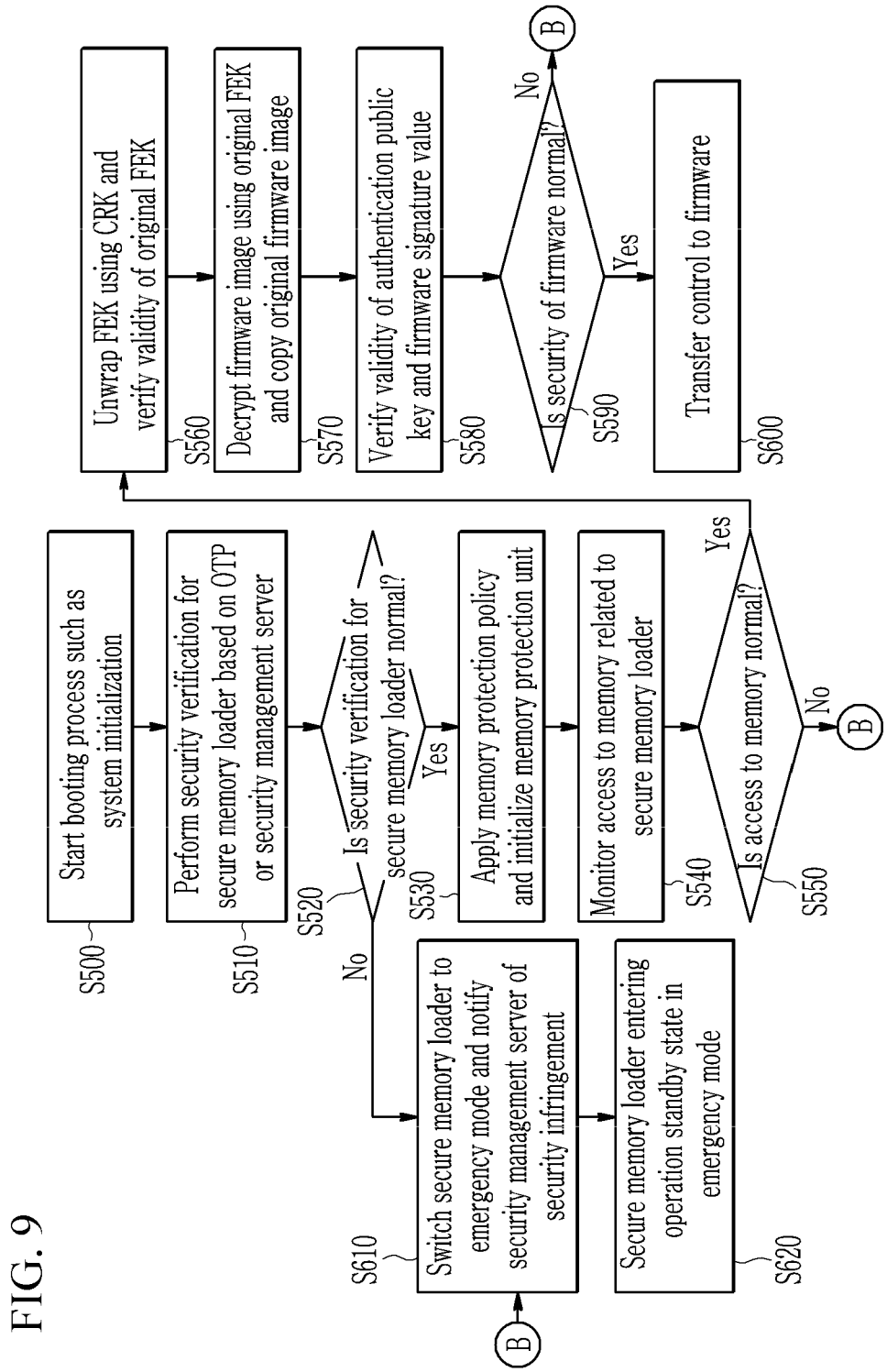
FIG. 9 is a flowchart illustrating a specific operation at system booting and initialization of a primary virtual trust computing base configured with a secure memory loader, a memory protection unit, and a one-time programmable memory according to an exemplary embodiment of the present invention.

FIG. 9 is a flowchart illustrating a specific operation at system booting and initialization of a primary virtual trust computing base configured with a secure memory loader, a memory protection unit, and a one-time programmable memory according to an exemplary embodiment of the present invention.

During system boot and initialization, a virtual trust computing base is constituted using a secure memory loader, a memory protection unit, and a one-time programmable memory. Based on this, a process of performing secure memory loader self-verification and firmware reliability (confidentiality, authentication, integrity) verification is performed as shown in FIG. 9.

Specifically, as shown in FIG. 9, when power is supplied to the service device 1 or a CPU reset procedure is performed, the process of system initialization and booting occurs by the boot code stored in the internal boot ROM or the boot loader included in the secure memory loader (S500).

The secure memory loader of the flash memory 113 of the service device 1 performs the relevant memory security verification procedure prior to performing the function (S510). At this time, the secure memory loader may use an OTP memory or a device security management server for self-verification. In addition, the secure memory loader code, the secure memory loader header, the memory protection policy, the key information, the authentication information, the network code, the crypto code, and the like may be verified when performing the security verification for the secure memory loader.

If the result of the security verification related to the secure memory loader is normal (S520), the process of FIG. 9 proceeds to step S530. If not, it goes to step S610.

When the result of the security verification related to the secure memory loader is normal, the secure memory loader applies the memory protection policy to the register area of the memory protection unit 112 and initializes the memory protection unit 112 (S530). To this end, the secure memory loader may include a driver code for the memory protection unit, or may locate the driver code in a separate memory area to use it.

The initialized memory protection unit 112 performs the memory access control monitoring function according to the memory protection policy (S540). In one example, the type of the access control of the memory protection unit may include access control monitoring for the memory area associated with the secure memory loader, any modification to the associated memory area, access to the dedicated stack memory space associated with the secure memory loader, access to a memory protection module register, and the like.

As a result of performing the memory access control monitoring, if there is no attempt to access the memory or arbitrary modification that violates the memory protection policy (S550), the process of FIG. 9 proceeds to step S560. If not, it goes to step S610.

When the memory access state is normal without attempting to access or modify the memory in violation of the memory protection policy, the secure memory loader checks the CRK and verifies the validity of the CRK using the OTP memory. That is, whether or not the CRK stored in the secure memory loader area of the flash memory 113 is valid is determined by using the data stored in the OTP memory (for example, CRK used in encrypting the secure memory loader image by the service providing apparatus or a digest value obtained by performing one-way hash on the CRK). If the CRK stored in the secure memory loader area is valid, the secure memory loader unwraps the AES-wrapped FEK using the CRK to obtain the original FEK key value. In addition, the secure memory loader may verify the validity of the obtained original FEK key value using the OTP memory (S560).

The secure memory loader decrypts the encrypted firmware image using the obtained original FEK to verify the confidentiality of the firmware and to obtain an original firmware image, and copies the obtained original firmware image to the firmware loading memory area (shown in FIG. 7) of the flash memory (S570).

Then, the secure memory loader extracts the F/W authentication public key and the F/W signature value from the secure memory loader area to verify the authentication and integrity of the original firmware image obtained by decryption, dynamically calculates a new F/W signature value using the original firmware image located in the firmware loading memory area (for example, the signature value of the original firmware image is calculated by using the authentication public key, the one-way hash function, and a signature calculation algorithm), and then compares the extracted F/W signature value with the calculated new F/W signature value to verify the reliability of the firmware (S580). At this time, it is possible to comply with an algorithm scheme such as the ECDSA when calculating the new F/W signature value and comparing the two signature values.

If it is determined that the firmware reliability is normal when the extracted F/W signature value matches the calculated new F/W signature (S590), the process of FIG. 9 proceeds to step S600. If it is determined that the firmware reliability is not normal when the extracted F/W signature value does not match the calculated new F/W signature, the process of FIG. 9 proceeds to step S610.

When the firmware reliability is normal, the secure memory loader finishes all operations and transfers control to the original firmware located in the firmware loading memory area (S600).

On the other hand, when the firmware reliability is not normal, the secure memory loader switches to an emergency mode and forwards, to the device security management server, a defect which is recognized by the results of the self-verification in step S520 or is reported by the memory protection unit 112 in step S550, and a problem that the two firmware signature values are matched in step S590 (S610).

Thereafter, the secure memory loader operates in the emergency mode, and waits for an instruction or a request of the device security management server (S620).

Figure 10:
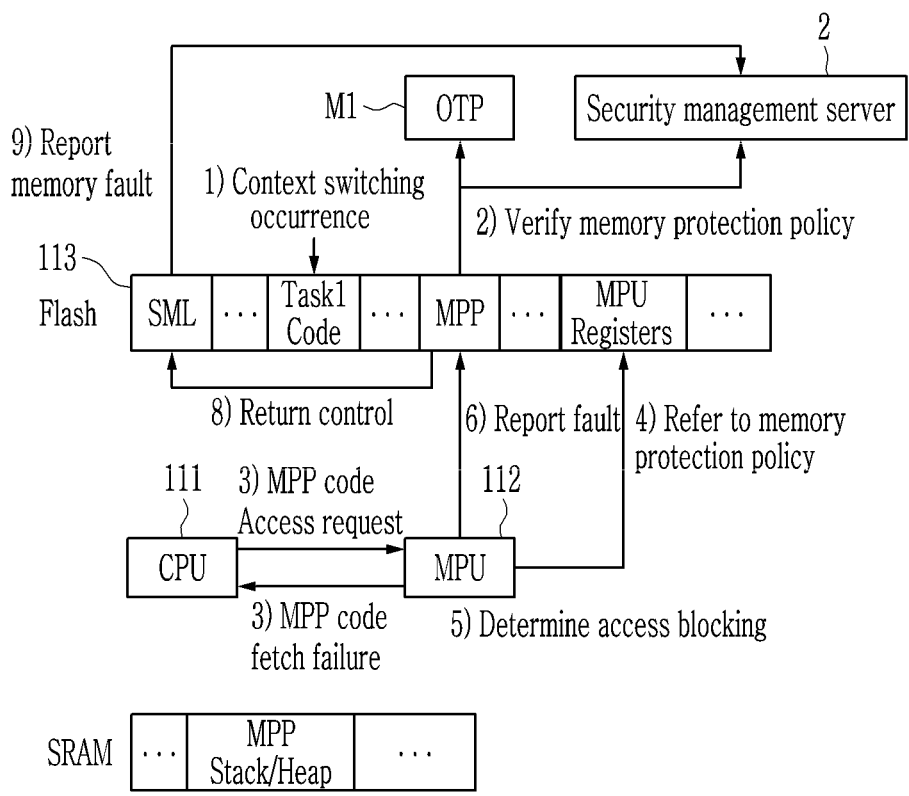
FIG. 10 is a diagram illustrating a memory monitoring and access control operation during a firmware operation based on a secondary virtual trust computing base configured with a memory protection process, a memory protection unit, and a one-time programmable memory according to an exemplary embodiment of the present invention.

FIG. 10 is a diagram illustrating a memory monitoring and access control operation during a firmware operation based on a secondary virtual trust computing base configured with a memory protection process, a memory protection unit, and a one-time programmable memory according to an exemplary embodiment of the present invention.

One embodiment will be described with reference to FIG. 10, focusing on how the memory protection policy and the memory protection unit realizes memory access control when the firmware is normally loaded and operated.

In a secure memory loader operation, the virtual trust computing base is configured by a memory protection process, a memory protection unit, and a one-time programmable memory (or a device security management server). In addition, the memory protection unit is initialized and operates in accordance with the memory protection policy of the secure memory loader area described above in FIG. 7. As described above, when the firmware reliability is determined to be normal and the control is transferred from the secure memory loader to the firmware, the memory monitoring and access control operation based on the virtual trust computing base is performed as follows.

Specifically, as shown in FIG. 10, context switching occurs by the scheduler of the firmware, and a Task 1 is set as the current context task (step 1).

In the memory protection process (MPP), which is configured in a form of a kernel module of the firmware, the context switching and the current context task are recognized as an event, and the validity of the memory protection policy (a register value of the memory protection unit) is verified by using the device security management server (step 2). In an embodiment of the present invention, the memory protection process may be a separate confidential process that operates independently of the firmware's scheduler, or may be a confidential process that includes the functionality of the firmware's scheduler. In addition, the memory protection process may be set so as to block the context switching, inhibit the occurrence of the interrupt, or post-process the interrupt when operating.

If the validation result of the memory protection policy is determined to be normal, normal execution of the task 1 is guaranteed. Here, for example, it is assumed that the task 1 attempts access to a massively parallel processing (MPP) code.

According to the request of the task 1, the CPU 111 requests the access to the memory protection unit 112 (step 3). Accordingly, the memory protection unit 112 first refers to the memory protection policy (step 4).

The memory protection unit 112 determines whether or not the access request of the CPU according to the request of the task 1 is permitted. Here, since the task 1 has attempted to access the code area of the memory protection process in which confidentiality should be maintained, the memory protection unit 112 blocks the access according to the memory protection policy (step 5). In addition, the data memory areas of the SRAM, such as the stack and heap used by the memory protection process, are also monitored by the memory protection unit.

The memory protection unit 112 notifies the memory protection process of the firmware that a fault related to the memory access control has occurred (step 6). At the same time, the memory protection unit 112 notifies the CPU 111 that access to the memory protection process code has failed (step 7).

Then, the memory protection process of the firmware transfers control to the secure memory loader (step 8).

The security memory loader, which has been transferred the control, receives the memory defect report and forwards the relevant content to the device security management server 2.

The configuration of the virtual trust computing base provides the following advantages, as an example.

The user task may be delegated with the privileged permission of interrupt service routine as it is after the interrupt service routine is executed due to the interrupt occasion, and may perform an illegal operation. Even if such a problem occurs, with accordance to the virtual trust computing base configuration according to the embodiment of the present invention, an access and modification attempt to the memory protection policy or the memory protection process by the privileged task may be easily detected by the memory protection process.

Figure 11:
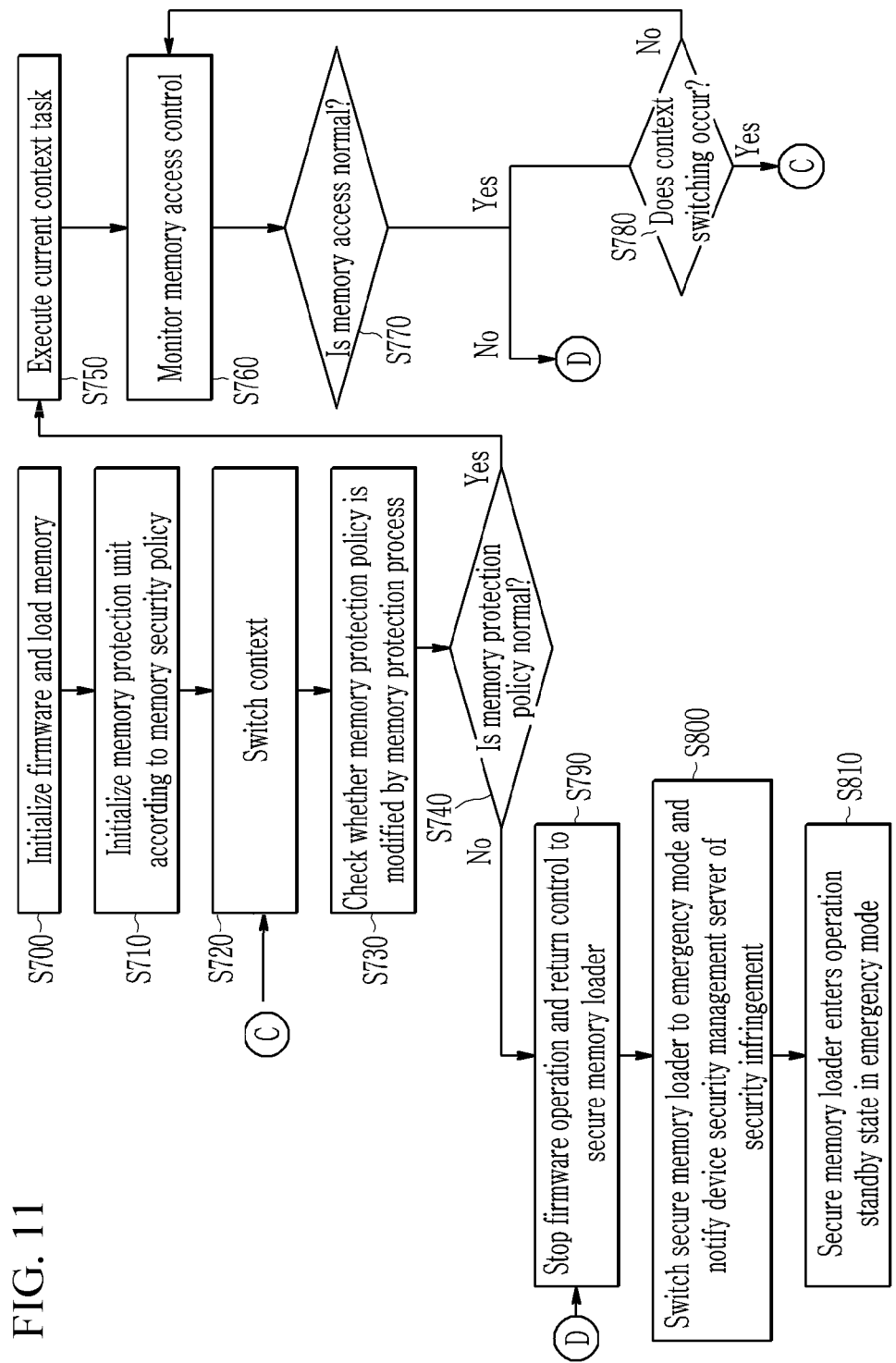
FIG. 11 is a flowchart illustrating specific operations after firmware normal loading of a secondary virtual trust computing base configured with a memory protection process, a memory protection unit, and a one-time programmable memory according to an exemplary embodiment of the present invention.

FIG. 11 is a flowchart illustrating specific operations after normal firmware loading of a secondary virtual trust computing base configured with a memory protection process, a memory protection unit, and a one-time programmable memory according to an exemplary embodiment of the present invention. Specifically, FIG. 11 shows a flowchart illustrating a process of configuring a virtual trust computing base using a memory protection process, a memory protection unit, and a one-time programmable memory, and performing a memory access control monitoring function on the basis of the virtual trust computing base after firmware is normally loaded.

As shown in FIG. 11, the firmware normally copied to a firmware loading memory area through the process as shown in FIG. 9 performs system initialization and loading (S700).

The firmware initializes the memory protection unit according to the memory security policy set by the security memory loader during the loading process (S710).

Context switching occurs between user tasks or system tasks included in the firmware, and a scheduler and task related function is performed (S720).

Upon occurrence of the context switching, the memory protection process of the firmware recognizes the context switching as an event, and verifies whether the memory protection policy is valid by using the one-time programmable memory or the device security management server as described in FIG. 10 (S730).

If it is verified that the validity of the memory protection policy is normal (S740), the process of FIG. 11 proceeds to step S750. If not, it goes to step S790.

When the validity of the memory protection policy is normal, the current context task is executed normally (S750). During the normal execution of the task, the memory protection unit performs the memory access control monitoring function by referring to the memory protection policy (S760).

As a result of the memory access control monitoring, if it is determined that the memory access is normal (S770), the process of FIG. 11 proceeds to step S780. If not, it goes to step S790.

If the context switching occurs when the memory access is in the normal state (S780), the process of FIG. 11 proceeds to step S720. If not, it goes to step S760.

Meanwhile, when the validity of the memory protection policy is not normal or the memory access is not normal, the memory protection process stops execution of the current context task and transfers control to the secure memory loader (S790).

Thereafter, the secure memory loader is switched to the emergency mode, and at the same time, forwards the security fault or problem reported by the memory protection process to the device security management server (S800). The secure memory loader operates in the emergency mode and waits for an instruction or request from the device security management server (S810).

Next, the device security management server will be described.

Figure 12:
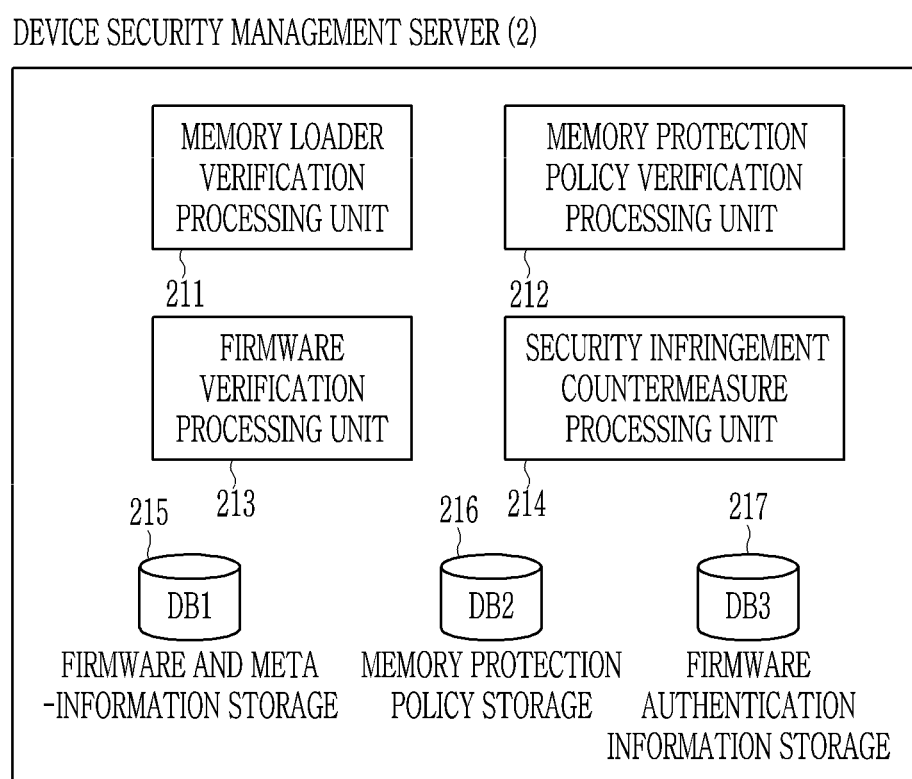
FIG. 12 is a diagram illustrating a structure of a device security management server according to an exemplary embodiment of the present invention.

FIG. 12 is a diagram illustrating a structure of a device security management server according to an exemplary embodiment of the present invention.

The device security management server 2 according to the embodiment of the present invention performs remote verification according to the request of the secure memory loader or the memory protection process as described above, and includes a memory loader verification processing unit 211, a memory protection policy verification processing unit 212, a firmware verification processing unit 213, and a security infringement countermeasure processing unit 214. The device security management server 2 further includes a firmware and meta-information storage 215, a, memory protection policy storage 216, and a firmware authentication information storage 217. The device security management server 2 may support general software and hardware functions provided by a conventional server computer.

When there is a security verification request for the secure memory loader from a service device (refer to step S510 in FIG. 9), the secure memory loader verification processing unit 211 processes the security verification request and returns the results.

When there is a firmware security verification request from the service device (refer to step S580 in FIG. 9), the firmware verification processing unit 213 processes the firmware security verification request and returns the result. For reference, it is assumed that firmware signature value verification is handled first by the secure memory loader.

When there is a validity verification request for the memory protection policy from a service device (refer to step S510 in FIG. 9), the memory protection policy verification processing unit 212 processes the validity verification request and returns the result. When there is a validity verification request for the memory protection policy from a service device (refer to step S730 in FIG. 11), the memory protection policy verification processing unit 212 processes the validity verification request and returns the result.

When the security infringement report from the service device is received (refer to step S620 in FIG. 9), the security infringement countermeasure processing unit 214 performs a countermeasure corresponding thereto. In addition, when the security infringement report is received from the service device (refer to step S800 in FIG. 11), the security infringement countermeasure processing unit 214 performs a countermeasure corresponding thereto.

The firmware and meta-information storage 215 receives and stores the firmware and meta-information generated through the previous steps of FIG. 7 based on the structures of FIG. 3, FIG. 4, and FIG. 5 from the service provider.

The memory protection policy storage 216 receives and stores the memory protection policy generated through the step S300 of FIG. 6 based on the structure of FIG. 3 from the service provider.

The firmware authentication information storage 217 receives and stores the firmware authentication information generated through steps S320 to S390 of FIG. 6 based on the structure of FIG. 5 from the service provider.

Figure 13:
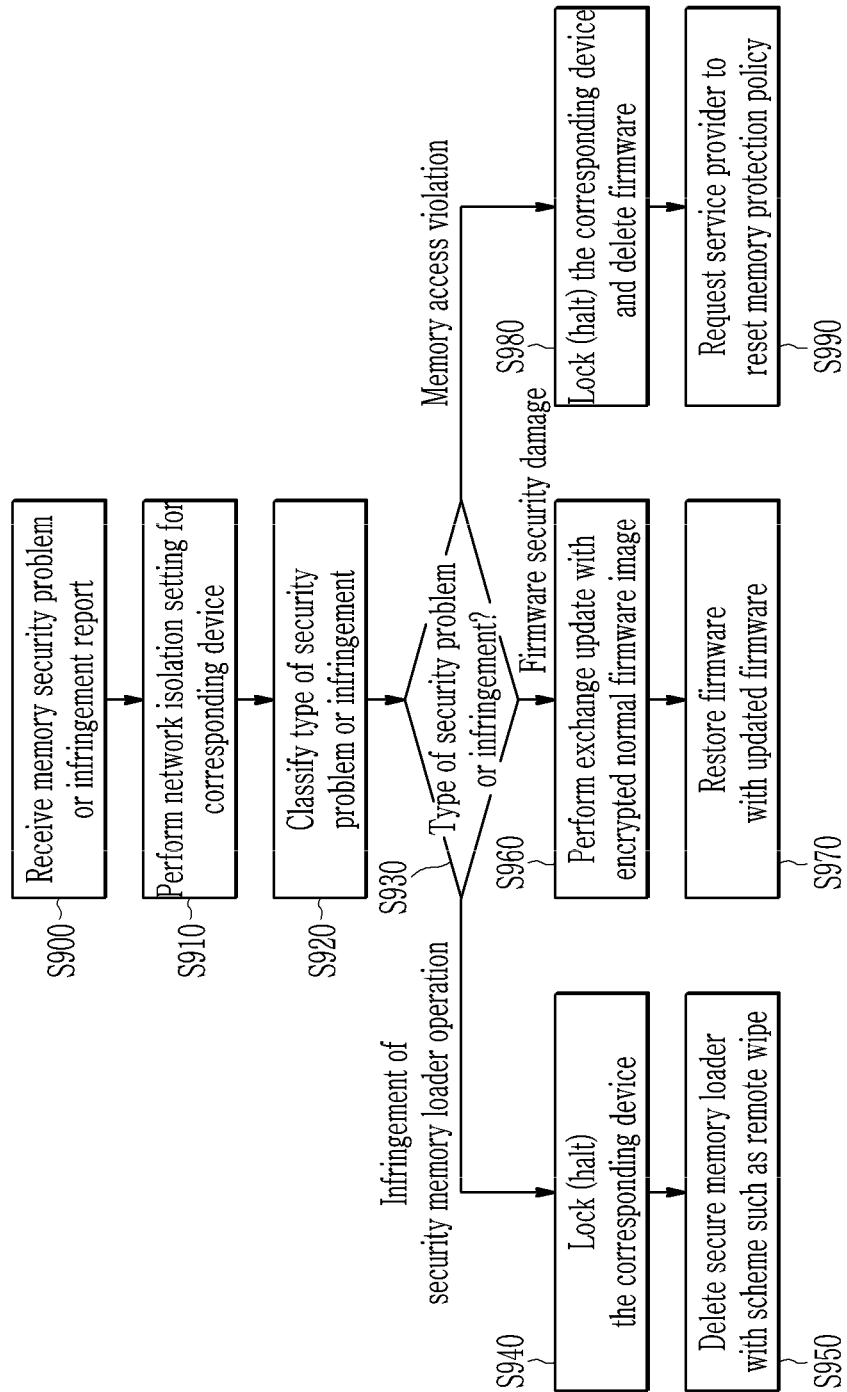
FIG. 13 is a flowchart of a process in which a device security management server receives and processes a security infringement report of a service device according to an exemplary embodiment of the present invention.

FIG. 13 is a flowchart of a process in which a device security management server receives and processes a security infringement report of a service device according to an exemplary embodiment of the present invention.

The device security management server 2 receives the memory security related infringement report from the secure memory loader operating on the specific service device (S900).

The device security management server 2 performs network isolation setting for the service device (S910).

Thereafter, the device security management server 2 analyzes and classifies the type of the received security problems or infringement (S920).

If the type of the security problem or infringement is 'infringement of security memory loader operation', the process of FIG. 13 proceeds to step S940, if the type of the security problem or infringement is 'firmware security damage', the process proceeds to step S960, and if the type is 'memory access violation', the process proceeds to step S980 (S930).

If the type of the security problem or infringement is 'infringement of security memory loader operation', the device security management server 2 forcibly stops and locks the operation of the corresponding service device (S940). The device security management server 2 deletes the secure memory loader by applying a technique such as a remote wipe to the corresponding service device (S950).

On the other hand, if the type of the security problem or infringement is 'firmware security damage', the device security management server 2 transmits an encrypted normal firmware image to the corresponding service device (S960). At this time, the security memory loader of the service device may include a firmware update code for receiving a normal firmware image from the device security management server 2.

Upon receipt of the encrypted normal firmware image, the secure memory loader of the service device decrypts the received firmware image and copies it to the firmware loading memory area (refer to FIG. 7) (S970). In carrying out this process, the secure memory loader may perform the process from step S500 to step S610 of FIG. 9.

On the other hand, if the type of the security problem or infringement is 'memory access violation', the device security management server 2 forcibly stops and locks the operation of the corresponding service device, and then deletes the existing firmware (S980). Then, the device security management server 2 requests the service provider (the service providing apparatus) to reset the memory protection policy (S990). The reset of the memory protection policy may be performed according to the structural procedures of FIG. 3 and FIG. 4. The service device according to the embodiment of the present invention may be a low-end computing device.

Figure 14:
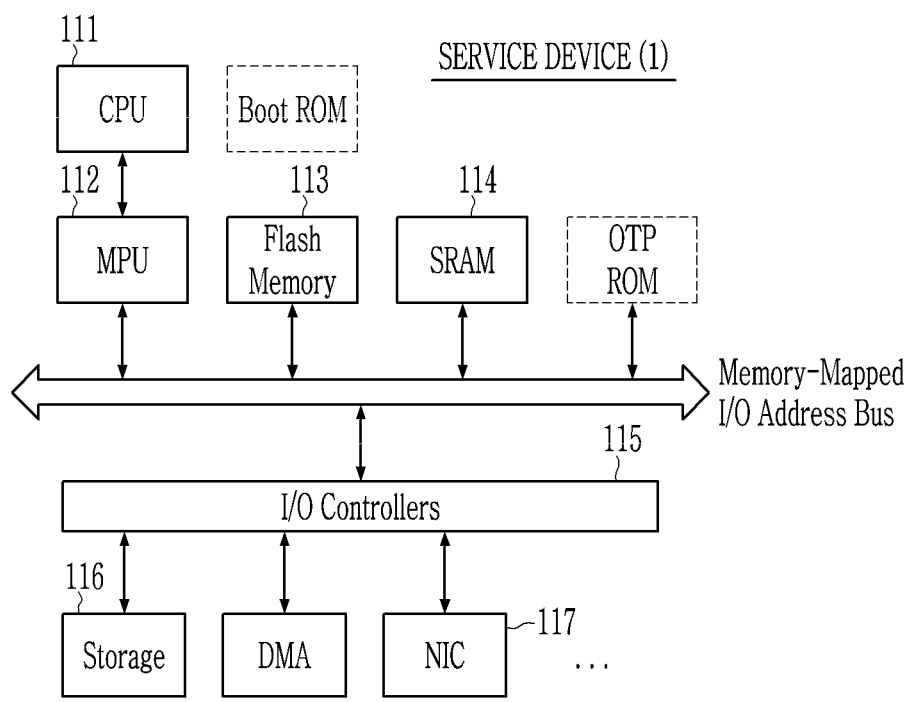
FIG. 14 is a diagram illustrating a specific structure of a service device according to an exemplary embodiment of the present invention.

FIG. 14 is a diagram illustrating a specific structure of a service device according to an exemplary embodiment of the present invention.

The service device may include a semiconductor device that executes processing instructions stored in a memory or storage via a CPU.

Specifically, the service device according to an embodiment of the present invention, as shown in FIG. 14, includes at least one CPU 111, an MPU 112, memories 113 and 114, an I/O controller 115, a storage device 116, and a network device 117. In addition, a direct memory access (DMA) and a user interface I/O device may be included. Communication with the device security management server through the network device 117 may be performed.

The memories 113 and 114 include a flash memory 113 and an SRAM 114, and may also include various types of volatile and nonvolatile memories such as a Boot ROM, an OTP, and the like.

The CPU 111 may be referred to as a processor, and access may be controlled through the MPU 112 when accessing a particular memory or storage device to fetch processing instructions. The CPU 111 and the MPU 112 may be configured to implement the operations described above based on FIGS. 2 and 7 to 11. The operation of the service device having such a structure may be referred to in the description of the above embodiments, and a detailed description thereof will be omitted here. The MPU 112 may also be referred to as a processor.

The storage device 116 is a storage medium capable of storing program codes, and may include, for example, a universal serial bus (USB) flash drive, a removable hard disk, a magnetic disk, and the like.

Figure 15:
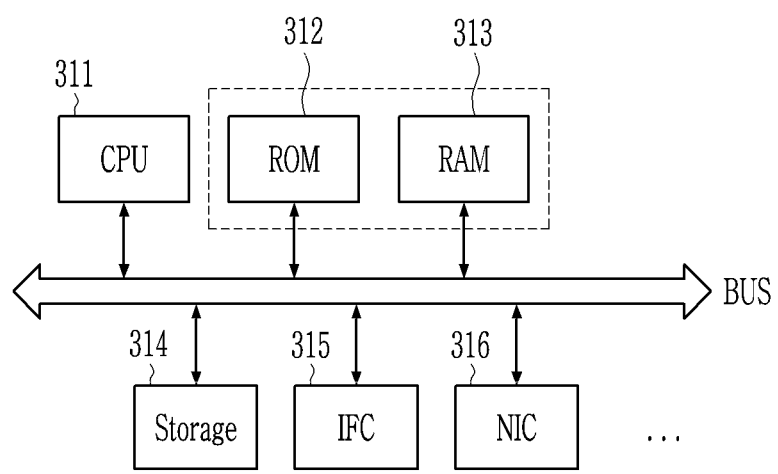
FIG. 15 is a diagram illustrating a specific structure of a service providing apparatus according to an exemplary embodiment of the present invention.

FIG. 15 is a diagram illustrating a specific structure of a service providing apparatus according to an exemplary embodiment of the present invention.

The service providing apparatus 3 according to an embodiment of the present invention includes at least one CPU 311, memories 312 and 313, a storage device 314, an interface device 315, and a network device 316.

The memories 312 and 313 may store various information related to the operation of the CPU 311. For example, the memories 312 and 313 may include a read only memory (ROM) 312 and a random access memory (RAM) 313.

The CPU 311 may be referred to as a processor, and the processor may be configured to implement the operations described above based on FIGS. 2 to 6. For example, the processor may be configured to implement the functions of the firmware object analysis processing unit, the memory protection policy generation processing unit, the memory protection policy applying processing unit, the symmetric key generation processing unit, the firmware encryption processing unit, the FEK wrapping processing unit, the encryption information applying processing unit, the authentication information management processing unit, the signature generation processing unit, the authentication information applying processing unit, the OTP generation processing unit, and the digest generation processing unit.

The interface device 315 includes an input interface device and an output interface device, and the network device 316 may transmit or receive a wired signal or a wireless signal.

The storage device 314 is a storage medium capable of storing program codes, and may include, for example, a USB flash drive, a removable hard disk, a magnetic disk, an optical disk, and the like.

The operation of the service providing apparatus having such a structure may be referred to the description of the embodiments described above, and detailed description thereof will be omitted here.

The configurations and embodiments of the present invention are not limited to the embodiments described above, and provide the technical flexibility to be extended and modified as appropriate for a typical application service environment intended for wireless, personal, or mobile computing devices.

According to the embodiments of the present invention, the following effects are provided.

1) It is possible to implement a low-cost similar trust computing base. The primary virtual trust computing base including a secure memory loader, a memory protection unit, and a one-time programmable memory is constructed at the time of system initialization, and the secondary virtual trust computing base including a memory protection process, a memory protection unit, and a one-time programmable memory is constructed at the time when firmware loading is completed. The memory protection unit and the one-time programmable memory, which are a common hardware module of the virtual trust computing bases, are generally installed in existing low-end computing devices and may be added at a low cost. In particular, it has a self-protection function for the memory protection policy itself used in the memory protection unit, and it is possible to provide a similar level of security provided by the existing hardware trust computing base.

2) It is possible to overcome the limitation of simple code memory integrity verification. Through a memory access control technology, it is possible to monitor in real time whether the security violation for access and authority to a code memory as well as a data memory occurs. Thus, it is possible to block the action that satisfies a malicious purpose by executing arbitrary code fragments in a sequential order, such as a return-oriented programming (RoP) attack. In addition, the access and authorization relationships between software tasks or modules are clearly defined through the memory protection policy, so that the isolation and connection between tasks or modules may be flexibly designed and operated according to the protection policy.

3) Remote device security management server intervention may be minimized. The embodiments of the present invention support a technique and system for verifying device security by configuring a virtual trust computing base, thereby providing an advantage of minimizing device control and intervention of a device security management server at a remote site.

Exemplary embodiments of the present invention may be implemented through a program for performing a function corresponding to a configuration according to an exemplary embodiment of the present invention and a recording medium with the program recorded therein, as well as through the aforementioned apparatus and/or method, and may be easily implemented by one of ordinary skill in the art to which the present invention pertains from the above description of the exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for device security verification, comprising:
verifying, by a security memory loader executed on a processor of a device after booting of a device performed, validity of a key for decryption of encrypted firmware in a state in which access to a memory of the device is guaranteed;
verifying, by the security memory loader, confidentiality of encrypted firmware stored in memory of the device by decrypting the encrypted firmware using the key when the key is valid; and
verifying, by the security memory loader, authentication and integrity of the decrypted firmware by comparing a signature value generated for the decrypted firmware with an existing signature value, wherein
the verifying of validity of the key and the verifying of authentication and integrity of the decrypted firmware are performed based on a virtual trust computing base configured with the secure memory loader, a memory protection unit of the device, and a one-time programmable memory in which a key value for verifying is stored.

2. The method of claim 1, wherein if connection with the one-time programmable memory is not possible, the verifying of validity of the key is performed through connection with a device security management server, and the key value for verifying is stored in the device security management server.

3. A method for device security verification, comprising:
performing, by a security memory loader executed on a processor of a device after booting of a device performed, self-security verification;
applying, by the security memory loader of which security is self-verified, a memory protection policy to a memory protection unit of the device, wherein the memory protection unit is initialized;
performing, by the memory protection unit, monitoring of the memory of the device in accordance with the memory protection policy;
verifying, by the security memory loader, validity of a key for decryption of encrypted firmware in a state in which access to a memory of the device is guaranteed;
verifying, by the security memory loader, confidentiality of encrypted firmware stored in memory of the device by decrypting the encrypted firmware using the key when the key is valid; and
verifying, by the security memory loader, authentication and integrity of the decrypted firmware by comparing a signature value generated for the decrypted firmware with an existing signature value.

4. The method of claim 3, wherein the verifying of validity of the key and the verifying of authentication and integrity of the decrypted firmware are performed based on a virtual trust computing base configured with the secure memory loader, the memory protection unit, and the one-time programmable memory.

5. The method of claim 3, wherein
the verifying of validity of a key comprises:
verifying, by the secure memory loader, validity of a first key obtained from the memory of the device in conjunction with the one-time programmable memory or the device security management server;
obtaining a third key from a second key stored in the memory of the device using the first key when the first key is valid; and
verifying validity of the third key in conjunction with the one-time programmable memory or the device security management server,
wherein the first key is a confidential root key (CRK) derived from a unique key value of the device, the second key is a firmware encryption key (FEK) wrapped according to an encryption algorithm by the first key, and the third key is an FEK used to encrypt the firmware.

6. The method of claim 3, wherein
the verifying of authentication and integrity of the decrypted firmware comprises:
obtaining, by the secure memory loader, an authentication public key and a signature value for the firmware from the memory of the device;
generating, by the secure memory loader, a new signature value for the firmware using the authentication public key and a signature calculation algorithm; and
verifying, by the secure memory loader, integrity of the firmware using the generated signature value and an existing signature value stored in the memory of the device.

7. The method of claim 3, further comprising:
receiving, by a memory protection unit of the device, a task request according to an event occurrence from a memory protection process of the decrypted firmware when the event occurs in a state where the decrypted firmware is executed on a processor of the device;
determining, by the memory protection unit of the device, whether to allow access to the memory of the device according to the task request based on a memory protection policy stored in the memory of the device; and
blocking, by the memory protection unit of the device, the access according to the task request when the task request violates the memory protection policy.

8. The method of claim 3, further comprising:
providing control of the device to the secure memory loader when the generated signature value is invalid as a result of the verifying authentication and integrity of the firmware;
forwarding, by the security memory loader, a relevant security violation to a device security management server and entering into an operation standby state; and
receiving, by the security memory loader, an encrypted normal firmware image including a firmware update code from the device security management server,
wherein the received encrypted normal firmware image is updated in the memory of the device.

9. The method of claim 3, further comprising
after the performing of self-security verification:
forwarding, by the security memory loader, a relevant security violation to a device security management server and entering into an operation standby state; and
deleting, by the device security management server, the secure memory loader.

10. The method of claim 3, further comprising
before the verifying of validity of a key
mounting a memory layout comprising the secure memory loader and an encrypted firmware image on the device.

11. The method of claim 6, wherein
the generating of a new signature value comprises generating a digest value of an original firmware image using the decrypted firmware and a one-way hash function and generating a new signature value of the original firmware image using the authenticated public key and the generated digest value, and
the verifying of integrity of the firmware comprises verifying the integrity and authenticity of the firmware according to an elliptic curve digital signature algorithm by using the newly generated signature value and the obtained existing signature value.

12. The method of claim 7, wherein,
in the receiving of a task request, validity of the memory protection policy is verified in conjunction with the one-time programmable memory or the device security management server when the event occurs, and
wherein the determining access to the memory of the device according to the task request and the verification of the memory protection policy validity are performed based on a virtual trust computing base configured with memory protection process, the memory protection unit, and the one-time programmable memory.

13. The method of claim 7, further comprising
after the blocking of the access according to the task request task:
transferring control of the device to the secure memory loader by the memory protection process of the firmware; and
forwarding, by the secure memory loader, a relevant security violation to the device security management server, and entering into an operation standby state.

14. The method of claim 10, wherein
the mounting comprises:
generating, by a service providing apparatus, a memory protection policy from an object analysis result of an original firmware image and inserting the generated memory protection policy into an original security memory loader image to generate a first modified security memory loader image;
encrypting, by the service providing apparatus, the original firmware image and inserting key information related to the encryption into the first modified security memory loader image to generate a second modified security memory loader image;
generating, by the service providing apparatus, a third modified security memory loader image by inserting an authentication public key and a signature value used for authenticating the original firmware image into the second modified security memory loader image; and
configuring, by the service providing apparatus, a memory layout including the third modified security memory loader image and the encrypted firmware image and mounting the memory layout on the device.

15. A computing device, comprising:
a memory configured based on a memory layout including a secure memory loader image and an encrypted firmware image;
a processor configured to load and execute the secure memory loader image of the memory; and
a memory protection unit processor configured to control access to the memory, wherein the processor is configured to execute the secure memory loader image after booting of the computing device, and wherein self-security verification of a secure memory loader is performed, and validity of a key for decryption is verified in conjunction with a one-time programmable memory or a device security management server by the security memory loader of which security is self-verified, encrypted firmware stored in the memory is decrypted by the secure memory loader using the key to verify confidentiality of the firmware when the key is valid, and authentication and integrity of the firmware are verified by the secure memory loader by comparing a signature value generated for the decrypted firmware with an existing signature value, wherein the memory protection unit processor receives a task request according to an event occurrence by a memory protection process of the firmware while the decrypted firmware is executed on the processor, determines whether to access the memory, and blocks access to the task request if the task request violates the memory protection policy.

16. The computing device of claim 15, wherein
the processor is configured to verify, by the executed secure memory loader, validity of a confidential root key (CRK) derived from a unique key value stored in the memory of the computing device, and unwrap a wrapped firmware encryption key (FEK) stored in the memory using the CRK to decrypt the encrypted firmware using an original FEK when the CRK is valid.

17. The computing device of claim 15, wherein
the processor is configured to obtain an authentication public key and a signature value for the firmware from the memory by the executed secure memory loader, generate a signature value for the decrypted firmware using the authentication public key and an original firmware image stored in the memory, and verify authentication and integrity of the firmware according to an elliptic curve digital signature algorithm (ECDSA) using the generated signature value and the obtained signature value, wherein the firmware of which validity is verified is executed through the processor.

18. The computing device of claim 15, further comprising
a network device configured to perform communication through a network, wherein, when the self-security verification result of the security memory loader according to the self-security verification is abnormal or the authentication and integrity verification result of the firmware is abnormal, the processor is configured to notify a device security management server of a relevant security violation through the network device and receive a violation response result from the device security management server in an operation standby state.

19. The computing device of claim 15, wherein
the memory has a layout comprising a secure memory loader area, a firmware loading memory area, a memory protection unit register value, and a secure memory loader libraries, the secure memory loader area comprises a secure memory loader code, a secure memory loader header, a memory protection policy, key information used to encrypt the firmware, and authentication information used to authenticate the firmware, and the firmware loading memory area represents a space in which a decrypted firmware image is loaded after the encrypted firmware is decrypted with the key.

* * * * *